US012566939B2

(12) United States Patent
Moshovos et al.

(10) Patent No.: US 12,566,939 B2
(45) Date of Patent: Mar. 3, 2026

(54) QUANTIZATION FOR NEURAL NETWORK COMPUTATION

(71) Applicant: THE GOVERNING COUNCIL OF THE UNIVERSITY OF TORONTO, Toronto (CA)

(72) Inventors: Andreas Moshovos, Toronto (CA); Ali Hadi Zadeh, Toronto (CA); Isak Edo Vivancos, Cambridge (GB); Omar Mohamed Awad, Toronto (CA)

(73) Assignee: THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 0 days.

(21) Appl. No.: 17/130,690

(22) Filed: Dec. 22, 2020

(65) Prior Publication Data

US 2022/0092382 A1 Mar. 24, 2022

Related U.S. Application Data

(60) Provisional application No. 63/082,009, filed on Sep. 23, 2020.

(51) Int. Cl.
*G06N 3/04* (2023.01)
(52) U.S. Cl.
CPC .................................... *G06N 3/04* (2013.01)
(58) Field of Classification Search
CPC ........ G06N 3/04; G06N 3/0454; G06N 3/063; G06N 3/045; G06N 3/0495; G06N 3/0499; Y02D 10/00; G06F 7/5443; G06F 40/40
See application file for complete search history.

(56) References Cited

U.S. PATENT DOCUMENTS

2018/0189229 A1 7/2018 Desoli et al.
2018/0260690 A1 9/2018 Young et al.
(Continued)

FOREIGN PATENT DOCUMENTS

WO 2018193361 A1 10/2018

OTHER PUBLICATIONS

Garland et al., "Low Complexity Multiply Accumulate Unit for Weight-Sharing Convolutional Neural Networks", Jan. 22, 2017, IEEE Computer Architecture Letters, vol. 16, No. 2, pp. 132-135 (Year: 2017).*

(Continued)

*Primary Examiner* — Brent Johnston Hoover
(74) *Attorney, Agent, or Firm* — Bhole IP Law; Marc Lampert

(57) ABSTRACT

A method for memory storage including storing a neural network by storing values of the neural network each as a reference to a representative value; and, in some embodiments, storing additional values of the neural network. Each of the representative values can be generated by assigning each of the values of the neural network to a cluster; and for each cluster, selecting a centroid from the cluster. The method can include performing one or more multiply-accumulate operations $A_1B_1 + \ldots + A_nB_n$ on input vectors A and input vectors B, by accumulating input vectors A to an accumulated sum of input vectors A per input vector B having the same representative value and subsequently multiplying each of the accumulated sums of input vectors A by the representative value of the input vector B. A system is also described, as well as a method for configuring memory according to a data structure.

15 Claims, 12 Drawing Sheets

600 —

640 —

630 —

650 ---

(56) References Cited

U.S. PATENT DOCUMENTS

2018/0293758 A1    10/2018  Bar-On et al.
2020/0057934 A1*   2/2020   Yoo ......................... G06N 3/04

OTHER PUBLICATIONS

Han et al., "Deep Compression: Compressing Deep Neural Networks With Pruning, Trained Quantization and Huffman Coding", Feb. 15, 2016, ICLR 2016, pp. 1-14 (Year: 2016).*
Park et al., "Energy-efficient Neural Network Accelerator Based on Outlier-aware Low-precision Computation", Jul. 23, 2018, 2018 ACM/IEEE 45th Annual International Symposium on Computer Architecture (ISCA), pp. 688-698 (Year: 2018).*
Teknomo, "K-Means Clustering Tutorial", Jul. 2007, pp. 1-12 (Year: 2007).*
Banner et al., "ACIQ: Analytical Clipping for Integer Quantization of neural networks", Sep. 27, 2018, ICLR 2019 Conference Blind Submission, pp. 1-11 (Year: 2019).*
Shen et al., "Q-BERT: Hessian Based Ultra Low Precision Quantization of BERT", Apr. 3, 2020, The Thirty-Fourth AAAI Conference on Artificial Intelligence, pp. 8815-8821 (Year: 2020).*
Xu et al., "Deep Neural Network Compression with Single and Multiple Level Quantization", 2018, The Thirty-Second AAAI Conference on Artificial Intelligence (AAAI-18), pp. 4335-4342 (Year: 2018).*
Miljkovic et al., "Review of Novelty Detection Methods", May 28, 2010, MIPRO 2010, pp. 593-598. (Year: 2010).*
Hodge et al., "A Survey of Outlier Detection Methodologies", 2004, Artificial Intelligence Review 22, pp. 85-126. (Year: 2004).*
S. Han, H. Mao, and W. J. Dally, Deep compression: Compressing deep neural network with pruning, trained quantization and huffman coding in 4th International Conference on Learning Representations, ICLR 2016, San Juan, Puerto Rico, May 2-4, 2016, Conference Track Proceedings, Y. Bengio and Y. LeCun, Eds., 2016. [Online]. Available: http://arxiv.org/abs/1510.00149.
E. Park, S. Yoo, and P. Vajda, Value-aware quantization for training and inference of neural networks in Proceedings of the European Conference on Computer Vision (ECCV), 2018, pp. 58 / 595.
E. Park, D. Kim, and S. Yoo, Energy-Efficient Neural Network Accelerator Based on Outlier-Aware Low-Precision Computation. IEEE Press, 2018, p. 68x 698. [Online]. Available: https://doi.org/10.1109/ISCA.2018.00063.

* cited by examiner

600

640

Global Act Buffer

32b

256 Quantized
Weight Buffer

SPU

A,E

SPU
RF

W

PE 0

610

3b          3b    3b

• • •

32b

W    A

PE
RF

R

C →    E

16x1

C

R

32b

620

32b

610

W    A

PE
RF

R

C →    E

• • •

• • •

X

C

32b

PE 15

610

32b

W    A

PE
RF

R

C →    E

2x1

32b

C

8b

Control

32b

Outlier 0
Outlier 1    Index
Index

Centroid 0

Centroid 7

16 Input Activation Buffer

32b

630

32b

Outlier Weights &
Centroids FIFO

650

QUANTIZATION FOR NEURAL NETWORK COMPUTATION

FIELD OF THE INVENTION

The present specification relates generally to computation of neural networks in natural language processing, and, more specifically, to systems and methods for quantization of parameters of neural networks.

BACKGROUND OF THE INVENTION

Modern computing platforms, from servers to mobile and embedded devices, are energy constrained. Memory accesses, be it off- or on-chip, account for a significant fraction of overall energy consumption when executing neural models. Memory footprint, bandwidth and energy limitations are most acute for attention-based models in language understanding tasks.

Retraining and fine-tuning of a model can be computationally expensive or infeasible and may sacrifice accuracy if used to improve computational costs of a model.

SUMMARY OF THE INVENTION

According to an aspect, there is provided a computer-implemented method for memory storage, including storing a neural network in memory by: storing, in the memory, one or more values of the neural network each as a reference to a representative value.

In some embodiments, the method further includes storing, in the memory, one or more additional values of the neural network.

In some embodiments, the reference is the representative value.

In some embodiments, each of the references are generated by quantizing one of the one or more values of the neural network.

In some embodiments, the method further includes storing, in the memory, a reconstruction table storing each of the representative values for each of the references.

In some embodiments, each of the one or more representative values are generated by assigning each of the one or more values of the neural network to a cluster; and for each cluster, selecting a selected value from the cluster as the representative value for each of the one or more values of the neural network of the cluster.

In some embodiments, each selected value is a centroid, the centroid being an average of the one or more values of the neural network in the cluster that the selected value is selected from.

In some embodiments, the method further comprises: minimizing a sum of each distance between a) each of the one or more values of the neural network and b) the centroid of the cluster that the value is assigned to by iteratively: performing the assigning, the assigning further comprising reassigning a first value of the one or more values of the neural network from an original cluster of the clusters to a new cluster of the clusters where an original distance of the first value to the centroid of the original cluster is greater than a new distance of the first value to the centroid of the new cluster; and subsequently performing the selecting on at least the original cluster and the new cluster. The first value is a different value of the one or more values of the neural network upon each iteration.

In some embodiments, the method further includes generating an output from performing one or more multiply-accumulate operations $A_1B_1 + \ldots + A_nB_n$ on input vectors A and input vectors B, wherein n is the n-th input vector and wherein one or more of input vectors B are each one of the representative values, by accumulating input vectors A to an accumulated sum of input vectors A per input vector B having the same representative value and subsequently multiplying each of the accumulated sums of input vectors A by the representative value of the input vector B.

In some embodiments, one or more of the input vectors B are each one of the additional values.

In some embodiments, each of the additional values satisfy a criterion of a distribution, content, or value count of a component of the neural network.

In some embodiments, each of the additional values are in a component of the neural network and having a probability pdf less than a threshold value, the probability pdf defined by $$pdf(x \mid \mu, \sigma^2) = \frac{1}{\sqrt{2\pi\sigma^2}} e^{-\frac{(x-\mu)^2}{2\sigma^2}},$$

wherein x is the additional value, $\mu$ is a mean of one or more parameters in the component of the neural network having x, and $\sigma$ is a standard deviation of one or more parameters in the component of the neural network having x.

In some embodiments, each of the additional values are outside a threshold range from a distribution fit of both the values and the additional values in a component of the neural network.

In some embodiments, at least one of the references is encoded using three bits or four bits.

In some embodiments, at least one of the one or more values of the neural network is an embedding.

In some embodiments, at least one of the one or more values of the neural network is a weight.

In accordance with an aspect, there is provided a system for computation of layers in a neural network, including one or more processing elements each configured to accumulate one or more values of the neural network for each of one or more references to an identical representative value to generate an output for each accumulation; and a shared processing unit configured to, for each of the outputs from each processing element, multiply the output with the identical representative value respective to the output to generate a final output.

In some embodiments, the shared processing unit is further configured to accumulate one or more of the final outputs with one or more outlier values.

In accordance with an aspect, there is provided a computer system for memory storage, including a memory; at least one processor in communication with the computer memory, the memory comprising instructions which, when executed by the at least one processor, carries out the steps of storing a neural network in memory by storing, in the memory, one or more values of the neural network each as a reference to a representative value.

In some embodiments, the storing of the neural network in memory further includes storing, in the memory, one or more additional values of the neural network.

In some embodiments, each of the one or more representative values is generated by assigning each of the one or more values of the neural network to a cluster; and for each cluster, selecting a selected value from the cluster as the representative value for each of the one or more values of the neural network of the cluster.

In some embodiments, the steps further comprise minimizing a sum of each distance between a) each of the one or more values of the neural network and b) the selected value of the cluster that the value is assigned to by iteratively performing the assigning, the assigning further comprising reassigning a first value of the one or more values of the neural network from an original cluster of the clusters to a new cluster of the clusters where an original distance of the first value to the selected value of the original cluster is greater than a new distance of the first value to the selected value of the new cluster; and subsequently performing the selecting on at least the original cluster and the new cluster. The first value is a different value of the one or more values of the neural network upon each iteration.

In accordance with an aspect, there is provided a non-transient computer-readable medium containing computer-readable instructions which, when executed by a computer processor, perform a method of storing a neural network in memory by storing, in the memory, one or more values of the neural network each as a reference to a representative value.

In some embodiments, the storing of the neural network in memory further includes storing, in the memory, one or more additional values of the neural network.

In some embodiments, each of the one or more representative values is generated by assigning each of the one or more values of the neural network to a cluster; and for each cluster, selecting a selected value from the cluster as the representative value for each of the one or more values of the neural network of the cluster.

In some embodiments, each selected value is a centroid, the centroid being an average of the one or more values of the neural network in the cluster that the selected value is selected from.

In some embodiments, the method further includes minimizing a sum of each distance between a) each of the one or more values of the neural network and b) the centroid of the cluster that the value is assigned to by iteratively performing the assigning, the assigning further comprising reassigning a first value of the one or more values of the neural network from an original cluster of the clusters to a new cluster of the clusters where an original distance of the first value to the centroid of the original cluster is greater than a new distance of the first value to the centroid of the new cluster; and subsequently performing the selecting on at least the original cluster and the new cluster. The first value is a different value of the one or more values of the neural network upon each iteration.

In some embodiments, the method further includes generating an output from performing one or more multiply-accumulate operations $A_1B_1 + \ldots + A_nB_n$ on input vectors A and input vectors B, wherein n is the n-th input vector and wherein one or more of input vectors B are each one of the representative values, by accumulating input vectors A to an accumulated sum of input vectors A per input vector B having the same representative value and subsequently multiplying each of the accumulated sums of input vectors A by the representative value of the input vector B.

In some embodiments, one or more of the input vectors B are each one of the additional values.

Other aspects and features according to the present application will become apparent to those ordinarily skilled in the art upon review of the following description of embodiments of the invention in conjunction with the accompanying figures.

BRIEF DESCRIPTION OF THE DRAWINGS

Reference will be made to the accompanying figures to provide exemplary embodiments of the invention, incorporating principles and aspects of the present invention, and in which.

DETAILED DESCRIPTION OF EMBODIMENTS OF THE INVENTION

Figure 1A:
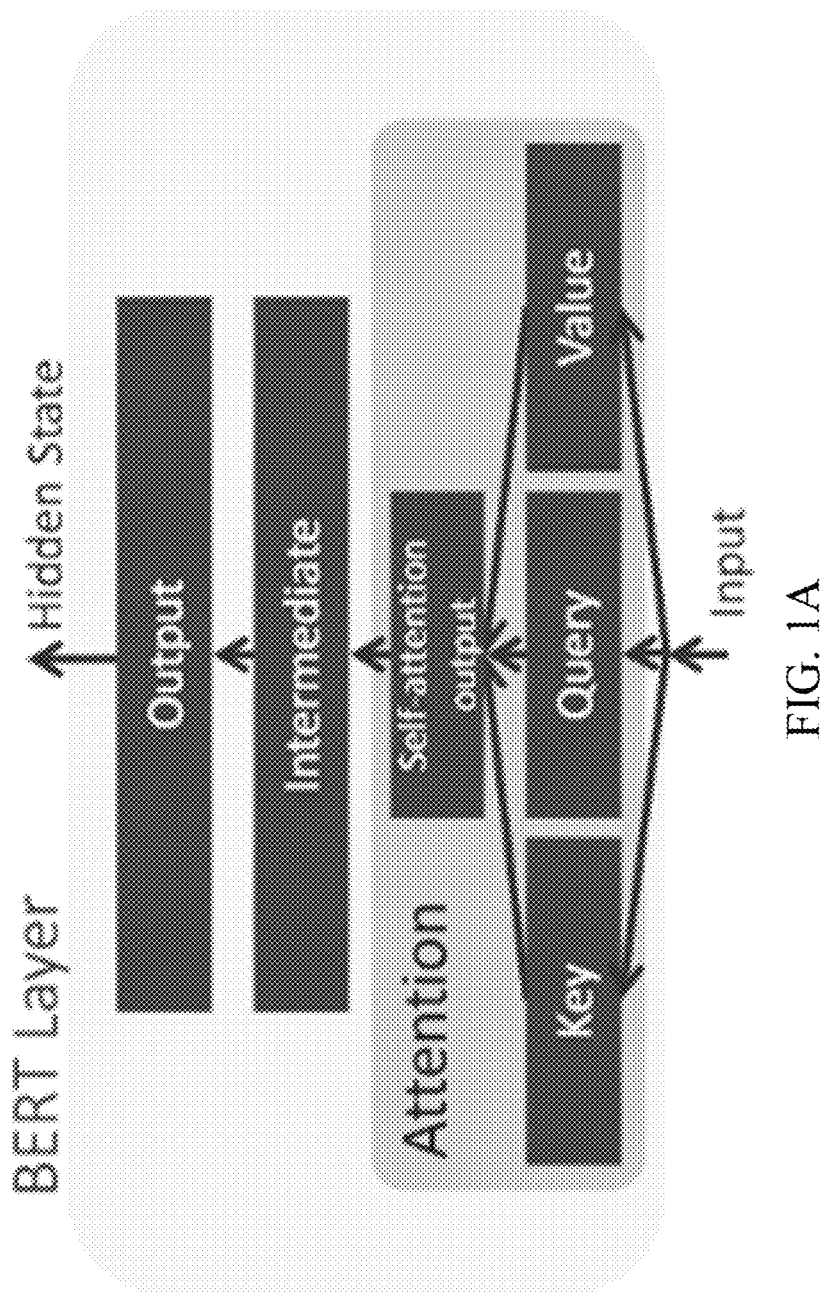
FIG. 1A shows a BERT layer architecture according to an embodiment.

Attention-based models have demonstrated remarkable success in various natural language understanding tasks. However, efficient execution remains a challenge for these models which are memory-bound due to their massive number of parameters. Embodiments herein provide GOBO, a model quantization technique that compresses the vast majority (e.g., 99.9%) of the 32-bit floating-point parameters of state-of-the-art BERT (Bidirectional Encoder Representations from Transformers) models and their variants to 3 bits while maintaining their accuracy. Unlike other quantization methods, GOBO does not require fine-tuning nor retraining to compensate for the quantization error. Two example practical hardware applications of embodiments of GOBO are described. In embodiments in the first example, GOBO reduces memory storage and traffic and as a result inference latency and energy consumption. This GOBO memory compression mechanism can be plug-in compatible with many architectures, for example, the TPU, Eyeriss, and an architecture using Tensor Cores-like units. In embodiments in the second example, a hardware architecture that also reduces computation is described. In some embodiments, the GOBO architecture maintains most of the weights in 3b even during computation. This can: (i) make the processing elements area efficient, allowing more compute power per unit area (ii) replace most multiply-accumulations with additions, and (iii) reduce the off-chip traffic by amplifying on-chip memory capacity.

Modern computing platforms, from servers to mobile and embedded devices, are energy constrained. Techniques for improving their energy efficiency can yield several benefits. They can reduce the energy footprint of data centers and operating costs and environmental impact. They can increase uptime for mobile devices, and they can boost the capability of all systems by allowing them to perform more computations per unit of time. Improving energy efficiency can be very important for deep learning workloads as they can be particularly compute and memory intensive, especially in neural network models that require more computations and memory.

Memory accesses, be it off- or on-chip, can account for a significant fraction of overall energy consumption when executing neural models. Memory footprint, bandwidth and energy limitations can be most acute for attention-based models in language understanding tasks. Among them, the BERT family of natural language models can deliver best-of-class accuracy. Their footprint, accesses, and execution time are dominated by the parameters (e.g., weights) of their numerous attention layers. The largest and most accurate among those models, BERT-Large has a footprint of 1.12 GB, while BERT-base sacrifices some accuracy to reduce footprint to 326 MB. These BERT models are particularly expensive to train and use 32b floating-point parameters even for inference. Training BERT-Large on 16 Cloud TPUs (64 TPU chips) can take 4 days. For this reason, a pre-trained version can be used and then refined to a target task. Refinement time can vary per task but usually takes hours to a few days for BERT-Large on an RTX 2080 Ti GPU. Some architecture modifications and quantization methods can reduce the cost of BERT models but may require fine-tuning and often sacrifice accuracy. Quantization methods can prolong training time by as much as 10×.

Embodiments described herein provide a model compaction method that can work directly off the fine-tuned models. Embodiments described herein provide a model compaction method, GOBO, for such attention-based models. In some embodiments, GOBO accepts as input a trained model and reduces the number of bits needed to represent its parameters be it weights or embeddings. In some embodiments, GOBO maintains accuracy without any further model refinement such as retraining or fine-tuning. Fine-tuning may use access to the dataset which may not be available or may be not possible under strict time constraints (e.g., daily updates to the model).

In some embodiments, GOBO compacts the original floating-point parameters representing the vast majority of them with 3b or 4b. For example, a floating-point parameter can be stored in memory as a representative value (e.g., as an index identifying a representative value such as in a data structure), where the representative value is encoded using 3b or 4b. In some embodiments, GOBO is plug-in compatible with an execution engine for transformer models as after decoding it, GOBO produces a model with identical architecture (e.g., layer dimensions, types, and connectivity) containing floating-point parameters. In some embodiments, GOBO can be used as an off- and on-chip compression method to reduce footprint, traffic and energy and can amplify bandwidth, capacity, performance and energy efficiency.

In some embodiments, GOBO can further boost performance and energy efficiency as GOBO can simplify computation converting most multiplications to additions. Embodiments described herein provide a specialized functional unit that takes advantage of GOBO's representation to reduce computation costs improving energy efficiency and performance.

Per layer in a neural network, the vast majority of weights can closely follow some Gaussian distribution (whose parameters vary across layers), with very few—for example, less 0.1% per layer—"outlier" weights being the exception. In some embodiments, GOBO first stores the few outlier weights as-is, and, second, GOBO uses a dictionary of very few—for example, 8—representative values (e.g., centroids) for all other weights. Other data structures can be used. The vast majority of the weights—for example, 99.9%—are then stored as 3b indexes in this example. In some embodiments, GOBO uses a novel representative value selection algorithm that results in higher accuracy and is much faster to converge compared to linear partitioning or K-Means.

Deep Compression is representative of a class of dictionary-based compression methods that can be used to compress the parameters of fixed-point models. It can be demonstrated on 16b fixed-point convolutional neural networks. An efficient inference engine (EIE) can take advantage of Deep Compression to greatly boost energy efficiency when executing the resulting sparse neural networks. It can store weights as Huffman-encoded indexes into a dictionary of few representative values. The weights are expanded into their 16b fixed-point representative values before the MAC units. Compared to Deep Compression, in some embodiments, GOBO does not require fine-tuning, can be used on attention-based models that use floating-point values and where preserving outliers can be important for maintaining accuracy, and uses a novel method for selecting the representative values. In addition, in some embodiments, the GOBO hardware architecture never expands the quantized weights to their representative floating-point values. This can improve computational efficiency and speed, as well as reduce computational cost, power, and energy consumption.

Outlier-aware quantization can also be applied to fixed-point convolutional models. Compared to some embodiments of GOBO, this requires determining in advance what fraction of values should be outliers, uses a much larger fraction of outliers (e.g., 3%-5%), uses linear quantization to reduce data width for the non-outliers, and requires fine-tuning of the model. In post-training quantization for convolutional neural networks, the values may tend to follow a bell-shaped distribution that can be taken advantage of using a piece-wise linear quantization. In contrast, in some embodiments, GOBO targets attention-based models which are floating-point based, automatically adjusts the fraction of outliers using a Gaussian distribution fit, utilizes a novel fast converging method for selecting the non-uniform quantization values for the non-outliers, and requires no fine-tuning. This can improve computational efficiency and speed, as well as reduce computational cost, power, and energy consumption.

Embodiments of GOBO can be evaluated on various datasets and state-of-the-art attention-based NLP models: BERT (two variants), DistilBERT, RoBERTa (two variants), HAT, and SpanBERT. Embodiments of GOBO can also be compared with two quantized BERT models, Q8BERT and Q-BERT.

According to various experiments conducted on some embodiments of GOBO: For the most challenging task in the GLUE (General Language Understanding Evaluation) MNLI (Multi-Genre Natural Language Inference) task, GOBO maintains accuracy while quantizing 99.9% of the weights to 3 bits. A centroid selection algorithm used by some embodiments of GOBO converges 9× faster than K-Means selection and consistently reduces the number of required centroids to half. A practical implementation of some embodiments of GOBO compression for off-chip memory reduces model footprint by 10×. For TPU, this translates to 10× performance. Under iso-compute-area constraints, an accelerator using some embodiments of GOBO's processing units is on average 7× faster than one based on TensorCore-like units and also consumes 3× less energy.

The BERT Family of NLP Models

Some embodiments of GOBO have been experimentally assessed using the BERT family of NLP models. Attributes of some these models will now be described.

Google's BERT is an attention-based model that is the model of choice for a variety of NLP tasks.

BERT-Large and BERT-Base: Training deep learning models capable of state-of-the-art accuracy on NLP tasks can be expensive in terms of time, energy and volume of data. To train BERT from scratch in less than 1 hour, a cluster with 1,472, V100 GPUs may be required. In this case, each V100 GPU has 32 GB of memory and consumes 450 W at a total power cost of 662 KW for the GPUs alone. To enable practical deployment for several tasks without access to such computing power and budgets the BERT framework introduced a "pre-training and fine-tuning" approach. In this case, BERT is pre-trained once on an unlabeled dataset—for example, billions of words—and then the pre-trained model can be fine-tuned for a few epochs to perform various tasks. Examples of two pre-trained BERT models are BERT-Base and BERT-Large. BERT-Large may achieve higher accuracy leveraging 3.5× more parameters.

Tasks: BERT is may be most useful in language understanding tasks, such as sentiment analysis, paraphrasing, sentence similarity detection, and question answering. GLUE and SQuAD (Stanford Question Answering Dataset) can be used as benchmarks for such tasks. The MNLI task of GLUE was used to assess embodiments of GOBO, since a) it is the most comprehensive inference task in the dataset, and b) it is the most sensitive task to quantization. MNLI given two provided sentences, the premise and the hypothesis, can predict if the premise entails the hypothesis, contradicts it, or neither. As a representative of other less sensitive to quantization tasks in GLUE, STS-B (Semantic Textual Similarity Benchmark) were used to assess embodiments of GOBO. STS-B can be used to predict the similarity score between two human-annotated sentences. Fine-tuning BERT for SQuAD may not be practical on a single GPU as its dataset is among the largest ones that are available. Some embodiments of GOBO were evaluated on an English to French translation task using a Transformer model (HAT).

Figures 1B, 1C:
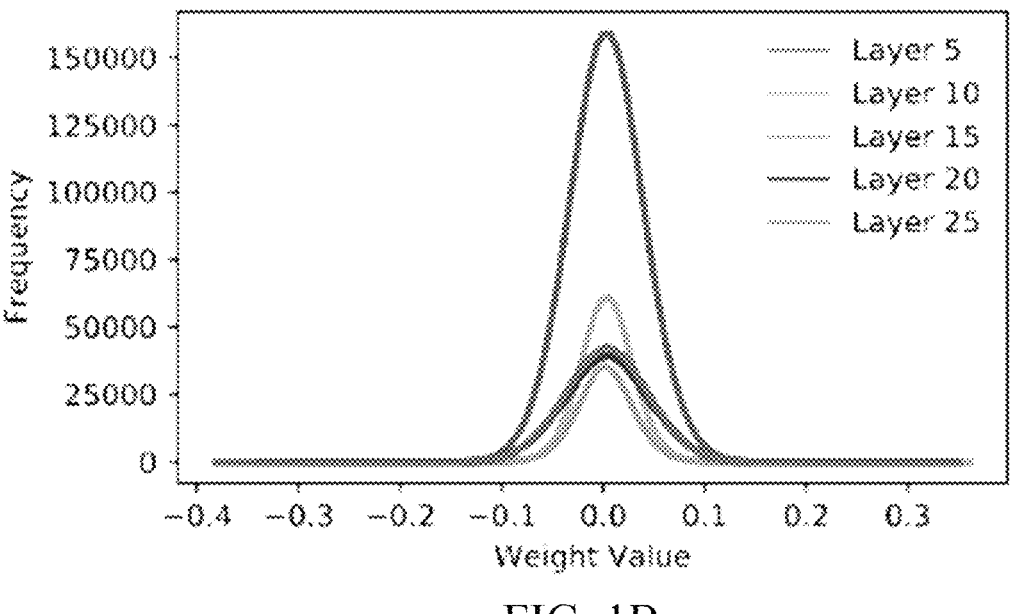
FIG. 1B shows per layer weight distribution for a BERT architecture according to an embodiment.
FIG. 1C shows a representation of weights of a BERT layer according to an embodiment.

BERT Architecture: BERT-base consists of 12 BERT Layers while BERT-large has 24. FIG. 1A to 1C are a schematic diagram or graphs showing an example BERT layer architecture and per layer weight values according to some embodiments. FIG. 1A shows that each BERT layer has 3 components: Attention, Intermediate, and Output. Each component includes a series of fully connected layers (FC) followed by a single normalization layer. FC layers are shown as boxes. The hidden state is a 768- to 1K-element vector (size can vary per model and layer). After the last BERT layer, there is a single FC layer, the Pooler. Table I details the configuration of these models. In total, BERT-Base has 73 (12×6+1) FC layers and 110 M parameters, whereas BERT-Large has 145 (24×6+1) and 340 M parameters. Activations and weights are 32b floating-point numbers and Table II reports the resulting memory footprint. Since BERT consists of mostly FC layers, and since the hidden state is a relatively short vector, it is the weights that dominate memory footprint and have to be streamed from off-chip. A set of embedding tables map the raw input into the vectors the network uses.

TABLE I

| BERT Architecture | | | | |
|---|---|---|---|---|
| | BERT-Base | | BERT-Large | |
| BERT layers | 12 | | 24 | |
| Component | FC # | Dimensions | FC # | Dimensions |
| Attention | 4× | 768 × 768 | 4× | 1024 × 1024 |
| Intermediate | 1× | 768 × 3072 | 1× | 1024 × 4096 |
| Output | 1× | 3072 × 768 | 1× | 4096 × 1024 |
| BERT Pooler | | 768 × 768 | | 1024 × 1024 |

Table II

| BERT Memory Footprint | | |
|---|---|---|
| Model | BERT-Base | BERT-Large |
| Embedding Tables | 89.42 MB | 119.22 MB |
| Weights | 326.26 MB | 1.12 GB |
| Model Input per Word | 3 KB | 4 KB |
| Largest Layer Acts per Word | 12 KB | 16 KB |
| Sequence Length | 128 | 128 |
| Activations | 1.5 MB | 2 MB |

BERT Derivatives: BERT variants may improve accuracy or reduce size compared to BERT. For example, DistilBERT uses knowledge distillation over the pre-trained BERT models to train a smaller, yet similar architecture. Facebook's RoBERTa uses hyperparameter tuning, a different training method and a different embedding table to improve accuracy while maintaining the same architecture. Some embodiments of GOBO were compared to two state-of-the-art quantized BERT variants, Intel's Q8BERT which uses 8b fixed-point values, and Q-BERT which uses dictionary compression.

Per Layer Weight Distribution: FIG. 1B shows the distribution of the weights for a few layers of BERT-Base which are representative of the shape of the distributions for the other layers. In every layer the weights closely follow a Gaussian distribution which can be described by the mean and standard deviation of the layer's weights. The Gaussian-like distribution of parameters can be observed in various DNNs. FIG. 1C shows a color coded representation of a layer's weights (one per x coordinate) based on the probability of each weight belonging to the layer's Gaussian distribution. This reveals that there is a tiny fraction of weights that are on the fringes of the Gaussian distribution as their magnitude is considerably larger than the rest of the weights.

In some embodiments, GOBO can be used to improve the computational performance of these BERT models. In some embodiments, GOBO splits the weights of each layer into two groups. For example, the "G" (Gaussian) group consists of weights whose magnitude fits within 99.9% of the values as described by the Gaussian distribution formed by the mean and standard deviation of all weights in the layer, while the second group, the "Outliers" ("O") includes values that fall outside the Gaussian distribution. Experimentally, according to some embodiments, it has been found that: 1) representing just the outliers precisely and quantizing the rest of the model to a few representative values (e.g., 8) is sufficient for maintaining model accuracy; and 2) using representative values for all weights either drastically reduces compression (e.g., too many representative values are used) or sacrificed accuracy. In some embodiments, the G group consists of weights whose magnitude fits within a threshold level relative to attributes of the Gaussian distribution, such as the mean or standard deviation or both of all weights in the layer of the neural network that the weight is in, while the O group consists of weights whose magnitude does not fit within the threshold level relative to the same or different attributes of the Gaussian distribution (or a different threshold level).

Application and Comparison of GOBO

Compression methods for NLP models fall under three different approaches, Model Quantization, Pruning, and Knowledge Distillation. In model quantization, the objective can be to reduce the number of bits for representing the model's parameters while keeping the model architecture as-is. Pruning's goal is to remove some of the weights by forcing them to be zero. Combining pruning with zero-aware memory encoding can reduce the model's footprint. Knowledge distillation trains a smaller model, the student, to mimic the behaviour of a much larger teacher model.

Model Quantization: Quantization techniques can be direct or indirect. Direct methods map the weights to a fixed-point representation, whereas indirect methods use a dictionary of representative values and encoded weights as indexes.

Intel's Q8BERT can use a fine-tuning method to quantize the weights and activations to 8-bit fixed-point values. Some operations such as Softmax and Layer Normalization are not quantized and use FP32. The accuracy of some embodiments of GOBO have been experimentally compared with Q8BERT on the MNLI task and the experiments show that GOBO reduces model size more than Q8BERT while maintaining accuracy. Furthermore, GOBO is faster to deploy since it does not require fine-tuning. Although the decompressed model with GOBO can use FP32 values, in some embodiments, the GOBO hardware accelerator performs most computations without decompressing the weights.

ERT is a dictionary based fine-tuning approach that can use a second order Hessian information to quantize the model's weights to a few (4 to 16) representative values. It can store weights as indexes to those values. Q-BERT can separate the weights of each layer into multiple groups and can quantize each group separately using per group dictionaries each of 4, 8 or 16 entries. Dividing each layer in 128 groups can result in acceptable accuracy. Finally, Q-BERT can quantize the embedding tables to 8b to avoid a significant loss in accuracy. In some embodiments, GOBO does not require fine-tuning, only keeps one dictionary per layer and quantizes the embedding layers to 3b. Some embodiments of GOBO were tested experimentally as described herein and shown to achieves higher compression than Q-BERT while maintaining accuracy.

Model Pruning: Weight pruning can reduce model footprint by forcing a portion of the weights to be zero. BERT can be pruned during training. For example, 30%-40% of the weights based on the magnitude may be pruned with minimal effect on the accuracy of the final task. MNLI may be a task that is most sensitive to pruning. Structured pruning can remove a series of weights that correspond to a component of the model. Attention head pruning and Encoder unit pruning are examples of this approach. Pruning methods require fine-tuning to compensate for the initial accuracy loss. Some embodiments of GOBO were tested experimentally as described herein and shown to achieve nearly 10× compression (e.g., 99.9% of 32b values are compressed to 3b). In some embodiments, even if we ignore its encoding overhead, a pruning method can remove nearly 90% of the weights to achieve similar compression. In some embodiments, GOBO is used to complement pruning.

Knowledge Distillation: Knowledge distillation can train a smaller model (student) from a larger model (teacher). Based on what the student learns from the teacher there can be three groups of Knowledge distillation approaches for BERT. In the first group, the student learns the behaviour of the encoder layer. The student can have fewer attention heads in each layer or fewer encoder layers. Another approach can train a student based on the output logits (input of the last layer's softmax). Furthermore, the student can adopt a different type of network or components thereof such as a Convolutional Neural Network (CNN) or Long Short Term Memory (LSTM). A Bidirectional LSTM (BiLSTM) based architecture can be used to replace the attention layers. A CNN-based model can be used to replace transformer layers where the student tries to learn the contextual dependence of the tokens (words) from the output of each attention layer. DistilBERT is a distilled model of BERT-Base and is about half in size. Some embodiments of GOBO were tested experimentally as described herein and shown to compress DistilBERT by 10× and result in a model that is 20× smaller than BERT-Base.

GOBO Quantization

In some embodiments, there is provided a computer-implemented method for memory storage including storing a neural network in memory by storing, in the memory, one or more values of the neural network each as a reference to a representative value; and storing, in the memory, one or more additional values of the neural network. In some embodiments, there is provided a computer-implemented method for memory storage including storing a neural network in memory by storing, in the memory, one or more values of the neural network each as a reference to a representative value. The one or more values of the neural network each stored as a reference to a representative value can comprise a "Gaussian" (G) group. In some embodiments, the one or more values of the neural network are stored as the representative value. Throughout this description, these values may be referred to as weights. In some embodiments, these values can be other values such as activations, parameters of the neural network, parameters of embeddings (e.g., in an embedding table), or any collection of values in a neural network, and may not be a weight. In some embodiments, the "Gaussian" group can refer to a group that is not Gaussian. For example, the "Gaussian" group can refer to a group having values according to a different distribution, such as non-uniform distributions. For example, this can be a Laplace distribution. The one or more additional values of the neural network can comprise an "Outlier" (O) group and can be referred to herein as an outlier weight. In some embodiments, as used herein the outlier weight can refer to other values such as outlier activations, outlier parameters of the neural network, or outlier parameters of embeddings (e.g., in an embedding table) and may not be a weight. As used herein, a neural network can refer to a component of a neural network or an embedding (e.g., an embedding table).

In some embodiments, for BERT, GOBO operates at the granularity of a layer and over the fine-tuned model. The compaction process starts with separating the weights into two groups, the "Gaussian" (G) and the "Outliers" (O). GOBO stores the outliers as-is (e.g., FP32) whereas it quantizes the "G" group values to a few representative values. For example, only a tiny fraction of the weights, typically less than 0.1%, may end up in the "O" group. In some embodiments, GOBO reduces overall model size by quantizing the Gaussian group. Since the weight distribution is not uniform, GOBO can use a non-linear quantization method that results in higher resolution where the weights are densely populated. This method can represent roughly 99.9% of the weights with just 8 representative FP32 values, while the inference error can be kept below 1% (or with 16 values for no accuracy loss). In some embodiments, a "G" group weight is stored as a 3b index to those representative values. In some embodiments, GOBO uses just one set of representative values per layer. Each set of representative values may be stored in a separate data structure. Each of the "G" group weights can be represented by a reference to the bin value of the data structure that stores the representative value assigned to the respective "G" group weight.

Figure 5A:
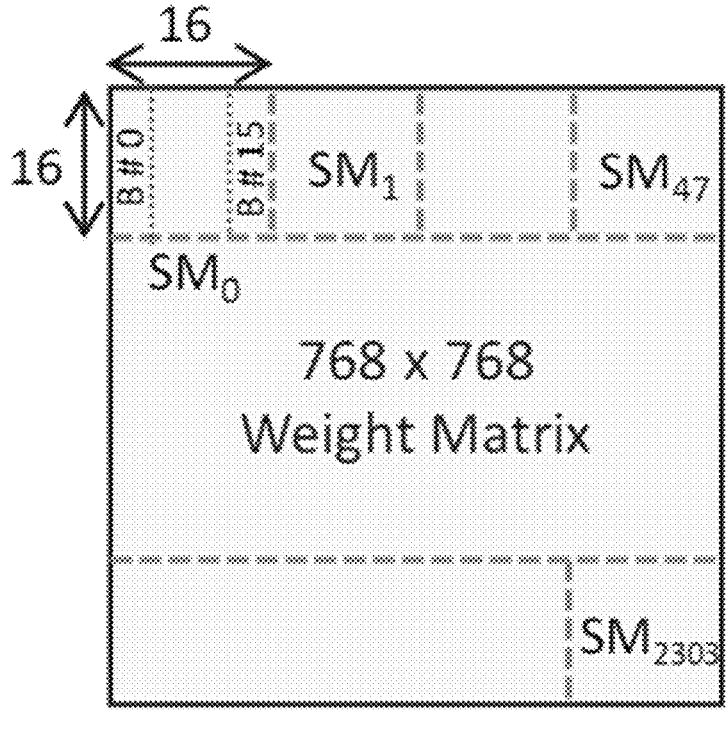
FIG. 5A shows a weight matrix for a GOBO memory compression according to an embodiment.
Figure 5B:
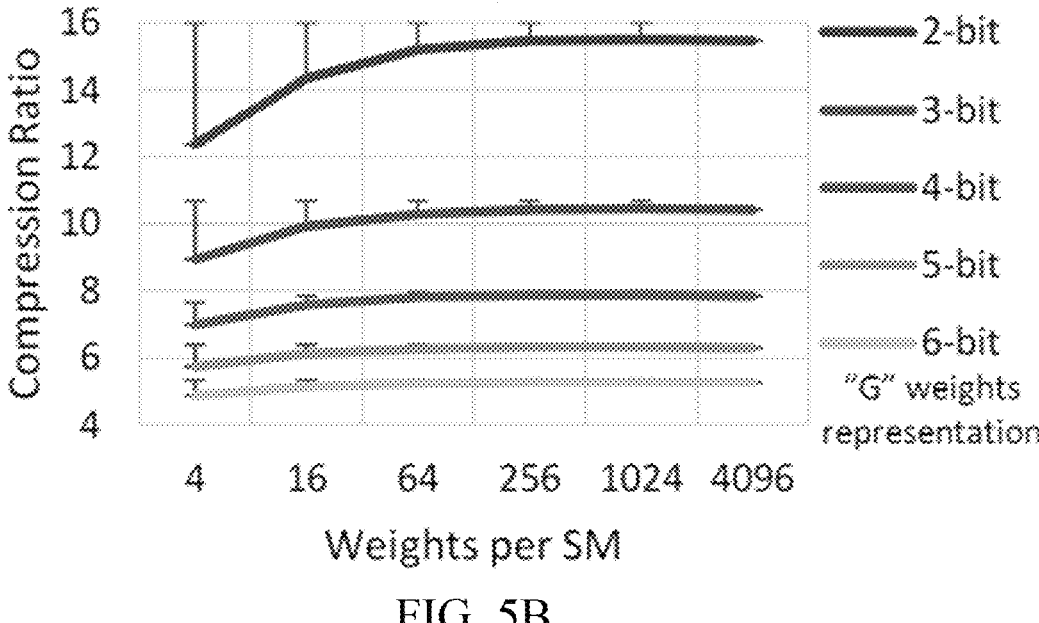
FIG. 5B shows an effect of submatrix size on compression ratio according to an embodiment.
Figure 5C:
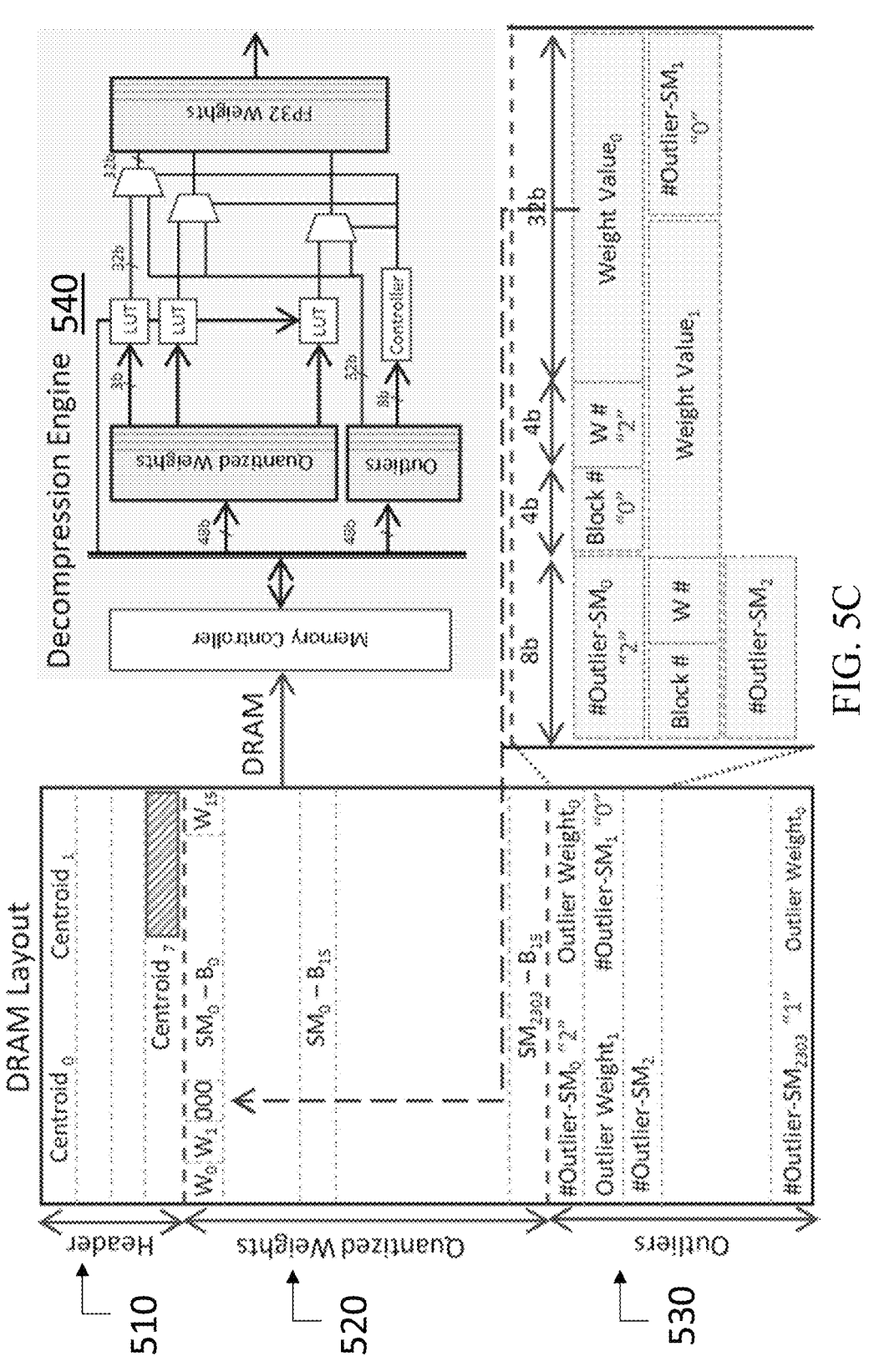
FIG. 5C shows a DRAM layout and a decompression engine for a GOBO memory compression according to an embodiment.

In some embodiments, GOBO stores the following information per layer: 1) The outliers in original form (e.g., FP32); 2) the bin index for each "G" group weight (e.g., 3b); 3) a data structure such as a reconstruction table for weights which represents the representative values (centroids) for each bin (e.g., FP32). The reconstruction table can be Header 510 as shown in FIG. 5C, for example. In some embodiments, GOBO stores this data per other component of a neural network aside from a layer. For example, multiple layers can be merged, this data can be stored per more than one layer, layers can be divided into smaller sublayers, or this data can be stored per sublayer of a layer.

Outlier Detection

In some embodiments, the additional values are determined using outlier detection. In some embodiments, each of the additional values are in a layer of the neural network and, in each layer, GOBO selects values to be the additional values, where the additional values are those having a probability pdf less than a threshold value, the probability pdf defined by $$pdf(x \mid \mu, \sigma^2) = \frac{1}{\sqrt{2\pi\sigma^2}} e^{-\frac{(x-\mu)^2}{2\sigma^2}},$$

wherein x is the additional value, μ is a mean of one or more parameters in the layer of the neural network having x, and σ is a standard deviation of one or more parameters in the layer of the neural network having x. The parameters can be values of the neural network, for example, the values (e.g., values in the "G" group) and the additional values (e.g., outlier values). In some embodiments, this is performed per component of the neural network other than a layer. In some embodiments, each of the additional values are outside a threshold range from a Gaussian distribution fit of both the values and the additional values. In some embodiments, the log of the threshold value is in the range of −5 to −3, inclusive, for example, −4. In some embodiments, each of the additional values are outside a threshold range from a criterion related to the values (e.g., corresponding to the "G" group) and the additional values (e.g., corresponding to the "0" group) in a component (e.g., a layer) of the neural network that includes the additional value.

In some embodiments, the additional values are determined using outlier detection according to a different method. For example, in some embodiments, each of the additional values satisfy a criterion of a distribution, content, or value count of a component of the neural network, such as a layer of the neural network. The component can be a component of the neural network that includes the additional value, such as a layer, sublayer, or group of multiple layers of the neural network. As an example, an outlier can be selected based on the threshold magnitude or on the total number of outliers desired (e.g., a pre-determined number of outliers). For example, in some embodiments, GOBO is configured to select a number of outliers (e.g., 100) by selecting that number of values (e.g., weights) with the highest distance from the mean value. For example, each of the additional values selected can be those that are the values having the highest distance from the mean value of the values in a component (e.g., layer) of the neural network that includes the additional value.

For example, in some embodiments, to detect the outlier weights for a FC layer, GOBO first computes the mean and the standard deviation of the layer's weights. Then per weight, it computes a probability that the weight belongs to that distribution using the PDF (Eq. 1) where x is the weight, ρ is the mean, and σ is the standard deviation. GOBO uses a threshold, a configuration parameter, to select outliers. A weight whose probability is less than the threshold is deemed as an outlier. For example, a log-probability threshold of −4 can be sufficient for maintaining overall accuracy. Other threshold values can be acceptable and can be adjusted as desired such as according to the particular application.

$$pdf(x \mid \mu, \sigma^2) = \frac{1}{\sqrt{2\pi\sigma^2}} e^{-\frac{(x-\mu)^2}{2\sigma^2}} \tag{1}$$

An outlier-aware quantization method can target fixed-point CNNs and consider a fixed, predetermined fraction of the weights (at least 3% which is an order of magnitude more than GOBO in some embodiments) as outliers. The outliers remain in 16b and non-outlier values are linearly quantized to 4b. To reduce the quantization error, fine-tuning is required. As GOBO uses nonlinear quantization in some embodiments, where the nonlinear quantization has about 1 outlier every 1000 weights, GOBO is sufficient for preserving accuracy without fine-tuning. In addition, in some embodiments, GOBO uses dictionary-based compression of the non-outlier group. Some embodiments of GOBO were tested experimentally as described herein with an outlier-aware inspired method that uses Linear Quantization for the non-outliers.

"G" Group Weight Quantization

In some embodiments, the representative value can be stored in the memory as a reference (e.g., index or bin number) to the representative value. In some embodiments, GOBO is configured to generate each representative value by quantizing a value (e.g., parameter such as a weight or activation) of the neural network. The value can be quantized to a reference (e.g., index or bin number) of a representative value. The reference can be encoded in 3b or 4b, for example. The representative value can be generated (e.g., by selecting) as a value based on one or more of the values of the neural network. For example, a function can be applied to the values of the neural network and the representative values can be selected using the function. For example, in some embodiments, the values of the neural network are clustered into mutually exclusive clusters, and a representative value for each of the values of the neural network in each cluster is selected, such as the average value of the values in each cluster. In some embodiments, a single representative value is assigned to each of the values of the neural network in the same cluster. Each of those values are stored in a data structure in memory and/or accessed as a reference to the representative value. The reference can be an index (e.g., bin value or reference to a memory location), such as indicating the representative value for that value of the neural network. The representative values can be stored in a data structure such as a dictionary.

In some embodiments, each of the one or more representative values are generated by assigning each of the one or more values of the neural network to a cluster; and for each cluster, selecting a selected value from the cluster as the representative value for each of the one or more values of the neural network of the cluster.

For example, in some embodiments, GOBO is configured to represent the "G" weights with few representative values (e.g., FP32 values). For example, in some embodiments, this is performed by clustering the weights and assigning a representative value per cluster. The clusters can be of equal population. Intuitively, this objective can put more clusters where weights are densely populated affording higher resolution where there are more weights. GOBO can be configured to implement this by sorting the weights and dividing them to equally sized clusters. The first and the last weight in each cluster determine the boundaries of that cluster.

In some embodiments, a value is selected from each cluster. In some embodiments, the selected value is centroid, the centroid being an average of the one or more values of the neural network in the cluster that the selected value is selected from. For example, the average of the weights inside each cluster can be used by GOBO as the centroid. Some embodiments of GOBO were tested experimentally and found that quantizing BERT-Base with this approach into 8 clusters (3b indexes) degrades inference accuracy by 10% in GLUE tasks.

To reduce this error, in some embodiments, GOBO is configured to use an iterative approach.

In some embodiments, GOBO is configured to assign each of one or more values of the neural network to a cluster and, for each cluster, select a selected value from the cluster as the representative value for each of the one or more values of the neural network of the cluster. To improve selection of the representative values, in some embodiments, GOBO is configured to minimize a sum of each distance between a) each of the one or more values of the neural network and b) the centroid of the cluster that the value is assigned to by iteratively: performing the assigning, the assigning further including reassigning a first value of the one or more values of the neural network from an original cluster of the clusters to a new cluster of the clusters where an original distance of the first value to the centroid of the original cluster is greater than a new distance of the first value to the centroid of the new cluster; and subsequently performing the selecting on at least the original cluster and the new cluster; wherein the first value is a different value of the one or more values of the neural network upon each iteration.

For example, in some embodiments, GOBO is configured to repeatedly apply the following two steps: 1) GOBO is configured to move a weight from cluster A to cluster B if the L1 distance of the weight and the centroid of cluster A is greater than the L1 distance of the weight and the centroid of cluster B; and 2) after re-assigning the weights to clusters, GOBO is configured to update the centroids by computing the new average over the weights of each cluster. This can be equivalent to minimizing the L2 distance. GOBO is configured to repeat this iterative process until the sum of L1 distances between centroids and weights is minimized. For example, for a 3b quantization, experiments were conducted on some embodiments of GOBO and showed that 7 iterations were enough to converge to the optimal solution.

Figure 2:
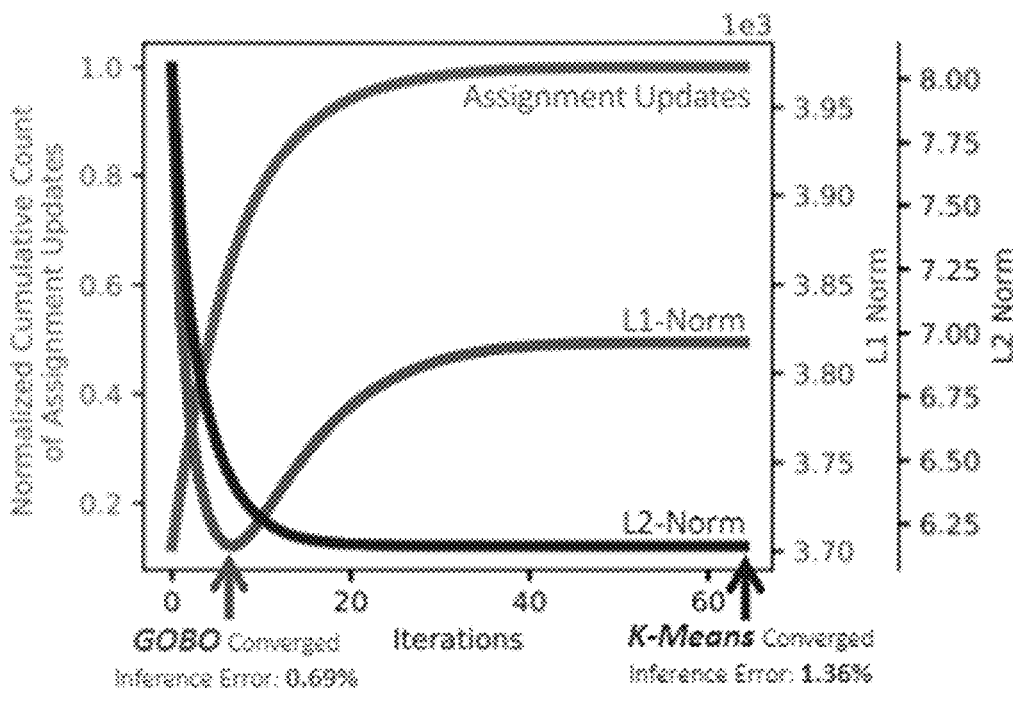
FIG. 2 shows GOBO and K-Means convergence according to an embodiment.

In some embodiments, experiments were performed and showed that terminating the process using the L1 is faster and results in a model with higher inference accuracy than using the L2. FIG. 2 is a graph showing GOBO and K-Means convergence according to some embodiments. FIG. 2 shows how the L1 and L2 evolve over time (iterations) and also the cumulative distribution of weight-to-bin reassignments. Weight reassignments follow Zipf's law with more than 80% of them happening in the first 15% of iterations. This explains the initial rapid drop in L1 which the first step of each iteration directly minimizes. Since reducing the L1 also reduces L2 (but not vice versa) this also improves L2. In some embodiments, the second step reassigns centroids to minimize L2 instead. As the FIG. 2 shows, this reassignment proceeds much more slowly and quickly hurts L1 as it overemphasizes weights that are further away from the centroid. Given a Gaussian distribution according to some embodiments, these weights disproportionately affect centroid selection reducing representation accuracy for all weights. Terminating when L1 is minimized better balances the per value representation accuracy. Empirically for some embodiments, emphasizing all weights equally rather the overemphasizing a few, results in better overall inference accuracy. Some embodiments of GOBO were tested experimentally and shown to converge 9× faster than K-Means and achieve higher accuracy.

Deep Compression uses dictionary compression for CNNs utilizing K-Means with linear initialization for cluster centroids and requiring fine-tuning to regain any accuracy loss. It minimizes the L2 Norm inside each cluster. In some embodiments, GOBO maintains the model's accuracy without any help from retraining. The centroid initialization in GOBO is nonlinear and depends on the per layer weight distribution according to some embodiments. In some embodiments, GOBO is configured to detect a few but effective outliers and keep them in their original representation. For example, these outliers can be stored as-is (e.g., without quantization) in memory or accessed or both during computation of the neural network or embedding table. In some embodiments, importantly, GOBO is configured to minimize L1-Norm within each cluster rather than L2. Algorithm 1 summarizes how GOBO compacts each layer according to some embodiments.

| Algorithm 1: GOBO Quantization |
| --- |
| 1     Compute the mean(m) and standard deviation(sd) of the weights; |
| 2     Detect outliers based on the Gaussian dist specified by m and sd; |
| 3     Store outlier weights as-is; |
| 4     Sort the "G" weights and place them into bins with equal capacity; |
| 5     Compute the min, max, and mean (centroid) of each bin; |
| 6     $L1_{new}$       L1-Norm of the current assignment; |
| 7     do |
| 8       $L1_{old}$      $L1_{new}$; |
| 9       Reassign weights the closest centroid; |
| 10      Update centroids based on the new assignment; |
| 11      $L1_{new} \leftarrow$ L1-Norm of the current assignment; |
| 12    while $L1_{old} \geq L1_{new}$; |

Accuracy and Compression Potential

Experiments were performed on some embodiments of GOBO to evaluate the effect of embodiments of GOBO on accuracy and compression rate. These experiments will now be described. Embodiments of GOBO implement the features described as used in these experiments. Any additional information that any practical encoding may use was ignored. As described herein, a specific encoding can be used to implement GOBO for off-chip memory compression. As it will be shown, in some embodiments, the overhead is tiny as it includes the representative values and the coordinates of the outliers. For example, the overhead can be encoded in a memory configuration as described herein.

Methodology: The pre-trained models, the scripts and datasets provided by the Hugging Face repository and the SciKit-Learn library were used. Specifically, to fit a Gaussian distribution sklearn.GaussianMixture was used with one Gaussian component. Then, the log probability for each weight was computed using score-samples. GOBO was configured to consider the weights with the log probabilities of –4 or less as outliers. To show the advantage of GOBO's clustering approach the accuracy of each model when the "G" weights are quantized by Linear Quantization and K-Means was compared. In linear quantization, the range of non-outlier weights ("G" group) was linearly divided by the number or bins ($2^{Bits}$). In K-Means the same centroid initialization as GOBO was used and iterations were performed until the cluster assignments converged. The outlier weights in all of these methods were detected and represented in the same manner. All experiments were performed on a dual RTX 2080 Ti 11 GB GPU system with an AMD Ryzen Threadripper 1920×CPU with 128 GB Quad-channel DDR4-3200 RAM.

Figure 3:
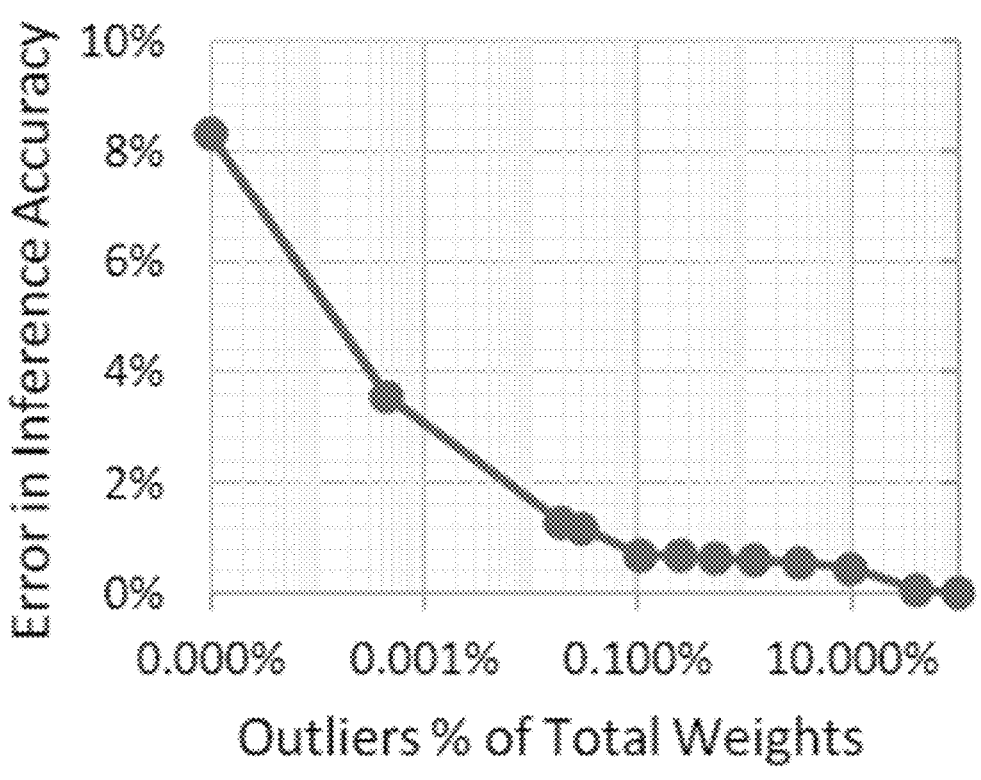
FIG. 3 shows an outlier's impact on inference accuracy of BERT-Base (MNLI) according to an embodiment.

Importance of Outliers: FIG. 3 is a graph showing the absolute loss in inference accuracy of 3-bit quantized BERT-Base on MNLI when the fraction of outliers is swept from 0% to 100%, according to some embodiments. GOBO according to some embodiments without outliers incurred an 8.3% accuracy loss. Having just 0.1% of outliers reduced this loss to less than 1% according to some embodiments of GOBO. Increasing the number of outliers by 100× to 10% improved accuracy by just 0.25% according to some embodiments of GOBO.

BERT-Base: Some embodiments of GOBO were compared to BERT-specific quantization methods. In this section we focus on the MNLI task which is the most challenging among the GLUE set of tasks. Table III shows accuracy on the MNLI task with different quantization methods: Intel's Q8BERT, Q-BERT, and GOBO with 3b or 4b "G" weights. Recall that Q-BERT and Q8BERT require fine-tuning. Using the Hugging Face PyTorch library, fine-tuning BERT-Base for the MNLI task on our dual GPU system took about 3 hours per epoch. We fine-tuned the model for 3 epochs as suggested by the Hugging Face documentation. After 3 epochs (9 hours) we achieved the baseline accuracy of 84.45%. Fine-tuning the same task on the same machine for Q8BERT, takes about 34 hours per epoch. Based on the authors' suggestion, we trained the model for 3 epochs (102 hours). Quantizing the same model with GOBO takes about 10 minutes using a single CPU core of our system.

The results showed that GOBO in some embodiments can compact the model by 9.8× and with less than 0.7% loss in accuracy and by 7.92× with no accuracy loss. Q-BERT can compact the model by 6.5× at a 0.56% accuracy loss or by 7.81× with a 1.04% accuracy loss. Q8BERT can reduce the model the least and by 4× at a 0.7% accuracy loss. Q8BERT uses 8b fixed-point. In some embodiments, GOBO was shown to produce models that are smaller and with similar or no accuracy loss, and produce the model within minutes instead of days.

The centroid selection method implemented by some embodiments of GOBO for the "G" group provides improved computer functionality over two other methods: linear quantization and K-Means. Experiments were performed on some embodiments of GOBO comparing GOBO configured to implement quantization as described herein according to some embodiments, GOBO with linear quantization, and GOBO with K-Means quantization. Accuracy was evaluated as the number of centroids was changed (all experiments have the same set of outliers). Tables IV shows that GOBO according to some embodiments implementing quantization as described herein when using 3b weights (8 centroids) incurs an accuracy loss of 0.69% which is considerably less than then 1.36% loss incurred with K-Means. Linear quantization performs the worst incurring an error of nearly 52%. To maintain the baseline accuracy, GOBO, K-Means and Linear Quantization used 4b, 5b, and 6b weight indexes respectively. Using 4b weight indexes amounts to a 33% increase over using 3b. The selection method implemented by some embodiments of GOBO as described herein is faster than K-Means.

Similar behavior was observed for the STS-B task as Table IV shows. STS-B is less sensitive to quantization. GOBO according to some embodiments incurs no accuracy loss with 3b, whereas K-Means needs 4b and linear quantization requires 5b.

BERT-Large: Experiments were performed to quantize BERT-Large on the SQuAD task. SQuAD is a complex task that requires days of fine-tuning when implemented over BERT-Large. GOBO was applied after this fine-tuning phase at a negligible cost in time. Table IV reports the compression and accuracy of the model with different quantization policies for the "G" group. The centroid selection policy implemented by some embodiments of GOBO was described herein proved best. With 3b weight indexes, the accuracy loss is less than 1% and with 4b there is none. For MNLI, GOBO incurred no accuracy loss even with 3b weight indexes. GOBO with K-means and GOBO with the centroid selection policy described herein was evaluated.

DistilBERT: Table V shows accuracy when quantizing DistilBERT which was distilled from BERT-Base and is about 2× smaller. GOBO in some embodiments incurred no or less than 1% accuracy loss with 4b and 3b weights respectively resulting in models that are 16× or 21× smaller than BERT-Base. In either case, K-Means required twice as many bins.

RoBERTa: Table VI shows accuracy and compression ratio. Quantizing to 3b "G" weights incurred an accuracy loss of 8%. Two FC layers ("Value layer" in self-attention and Intermediate layer) in the first 6 BERT Encoders are the most sensitive to quantization. Either the whole model can be quantized to 4b "G" weights (accuracy loss of just 0.6%), or better, 4b "G" weights can be used just for these two layers for the first 6 out of the 12 total Encoder layers and 3b for the rest. This reduces the accuracy loss to just 1.4%. Other configurations can be implemented.

TABLE III

Comparison of GOBO and BERT-Specific Quantization Methods.
BERT-Base on MNLI.

| BERT-Base (MNLI) | Weights | Embed-ding | Accuracy (m) | Error | No Fine-tuning | Com-pression Ratio |
|---|---|---|---|---|---|---|
| Baseline | FP32 | FP32 | 84.45% | — | — | 1x |
| Q8BERT [4] | 8-bit | 8-bit | 83.75% | 0.70% | x | 4x |
| Q-BERT [3] | 3-bit | 3-bit | 83.41% | 1.04% | x | 7.81x |
| Q-BERT [3] | 4-bit | 8-bit | 83.89% | 0.56% | x | 6.52x |
| GOBO | 3-bit | 4-bit | 83.76% | 0.69% | ✓ | 9.83x |
| GOBO | 4-bit | 4-bit | 84.45% | 0.00% | ✓ | 7.92x |

TABLE IV

GOBO w/"G" Group Centroid Selection Policies: BERT-Base/-Large.

| | Baseline | GOBO w/Linear Quant. | | GOBO w/K-Means | | GOBO | | Potential Comp. Ratio |
|---|---|---|---|---|---|---|---|---|

GLUE/MNLI with BERT-Base

| Bits | | Accuracy (m) | Error | Accuracy (m) | Error | Accuracy (m) | Error | Potential Comp. Ratio |
|---|---|---|---|---|---|---|---|---|
| 32 | 84.45% | — | — | — | — | — | — | 1× |
| 2 | — | 31.81% | 52.64% | 69.98% | 14.47% | 71.02% | 13.43% | 16× |
| 3 | — | 32.48% | 51.97% | 83.09% | 1.36% | 83.76% | 0.69% | 10.67× |
| 4 | — | 82.75% | 1.70% | 84.01% | 0.44% | 84.45% | 0.00% | 8× |
| 5 | — | 84.20% | 0.25% | 84.45% | 0.00% | | | 6.4× |
| 6 | — | 84.45% | 0.00% | | | | | 5.3× |

GLUE/STS-B on BERT-Base

| Bits | | Spearman | Error | Spearman | Error | Spearman | Error | Potential Comp. Ratio |
|---|---|---|---|---|---|---|---|---|
| 32 | 88.33% | — | — | — | — | — | — | 1× |
| 2 | — | 2.67% | 85.66% | 81.12% | 7.21% | 82.66% | 5.67% | 16× |
| 3 | — | 74.00% | 14.33% | 88.11% | 0.22% | 88.33% | 0.00% | 10.67× |
| 4 | — | 87.46% | 0.87% | 88.33% | 0.00% | | | 8× |
| 5 | — | 88.33% | 0.00% | | | | | 6.4× |

SQuAD v1.1 with BERT-Large

| Bits | | F1 Score | Error | F1 Score | Error | F1 Score | Error | Potential Comp. Ratio |
|---|---|---|---|---|---|---|---|---|
| 32 | 91.95% | — | — | — | — | — | — | 1× |
| 2 | — | 0.01% | 91.94% | 34.83% | 57.12% | 56.22% | 35.73% | 16× |
| 3 | — | 5.37% | 86.58% | 90.56% | 1.39% | 91.04% | 0.91% | 10.67× |
| 4 | — | 89.11% | 2.84% | 91.24% | 0.71% | 91.95% | 0.00% | 8× |
| 5 | — | 90.61% | 1.34% | 91.92% | 0.03% | | | 6.4× |
| 6 | — | 91.88% | 0.07% | 91.95% | 0.00% | | | 5.3× |
| 7 | — | 91.95% | 0.00% | | | | | 4.57× |

TABLE V

GOBO w/"G" Group Centroid Selection Policies;
GLUE/MNLI on DistilBERT.

| | Baseline | GOBO w/K-Means | | GOBO | | Potential |
|---|---|---|---|---|---|---|
| Bits | Accuracy (m) | Accuracy (m) | Error | Accuracy (m) | Error | Comp. Ratio |
| 32 | 81.98% | — | — | — | — | 1× |
| 3 | — | 80.83% | 1.15% | 81.30% | 0.68% | 10.67× |
| 4 | — | 81.78% | 0.20% | 81.98% | 0.00% | 8× |
| 5 | — | 81.98% | 0.00% | | | 6.4× |

TABLE VI

GOBO w/"G" Group Centroid Selection Policies: GLUE/MNLI on RoBERTa.

| | RoBERTa-Base | | | | | | RoBERTa-Large | | | | | |
|---|---|---|---|---|---|---|---|---|---|---|---|---|
| | Baseline. | GOBO + K-Means | | GOBO | | Potential | Baseline | GOBO + K-Means | | GOBO | | Potential |
| Bits | Acc. (m) | Acc. (m) | Error | Acc. (m) | Error | CR | Acc. (m) | Acc. (m) | Error | Acc. (m) | Error | CR |
| 32 | 87.60% | — | — | — | — | 1× | 90.20% | — | — | — | — | 1× |
| 3 | — | 76.00% | 11.60% | 79.68% | 7.92% | 10.67× | — | 82.18% | 8.02% | 84.26% | 5.94% | 10.67× |
| 3b/4b | | | | 86.19% | 1.41% | 10.13× | — | | | 39.33% | 0.87% | 10.03× |
| 4 | | 86.80% | 0.80% | 87.30% | 0.30% | 8× | — | 89.48% | 0.72% | 89.88% | 0.32% | 8× |
| 5 | — | 87.32% | 0.23% | 87.60% | 0.00% | 6.4× | — | 90.07% | 0.13% | 90.20% | 0.00% | 6.4× |
| 6 | — | 87.60% | 0.00% | | | 5.3× | — | 90.20% | 0.00% | | | 5.3× | loss in accuracy in some embodiments. In some embodiments, GOBO is configured to encode each of the references for the values (e.g., corresponding to the "G" group) of the neural network using three bits, except each of the references for the values in a value layer or in an intermediate layer for an encoder (e.g., an encoder layer) of the neural network, each of the references for the values in the value layer or in the intermediate layer for the encoder layer of the neural network being encoded using four bits. For example, the value layer and intermediate layer in a RoBERTa Architecture for the first few encoder layers may be the most RoBERTa-Large: achieved a score of 90% on MNLI and, as Table VI shows, was less sensitive to quantization compared to the RoBERTa. By quantizing the Value and Intermediate layers to 4b for the first 14 Encoders (out of 24) and to 3b for the rest GOBO was shown to achieve less than 1% sensitive to quantization and can be quantized to 4 bits, while the rest of layers are quantized to 3-bits. Other numbers of bits can be used.

HAT: GOBO according to some embodiments was evaluated on HAT produced models. HAT is a neural architecture search (NAS) method that composes Transformer models for efficient language translation on various hardware platforms. HAT designs FP32 models; however, accuracy may only be achieved when the model is quantized using KMeans with linear initialization and for a maximum of 300 iterations (similar to Deep Compression). Table VII shows the BLEU score on the WMT'14 En-Fr, English to French translation task when it is quantized by KMeans and GOBO. GOBO quantization according to some embodiments achieved 0.4 higher BLEU score at the expense of less than 1% extra footprint for the outliers. Where embedding tables were also quantized with GOBO, the compression ratio rises to 7.8×. GOBO according to some embodiments was shown to be effective for an attention model (different than the BERT family) where it outperforms a state-of-the-art dictionary-based quantization method.

SpanBERT: Certain architectures introduced 16b floating-point arithmetic targeting deep learning training and inference. In general, BERT models are trained with FP32. However, SpanBERT is a BERT-derived model that has been successfully trained to work with FP16. Table VIII shows the evaluation of GOBO according to some embodiments on Facebook's SpanBERT on SQuADv1.1 and SQuADv2 datasets. GOBO with 3b matches the baseline accuracy on SQuADv2 and results in less than 1% error in SQuADv1.1. GOBO achieves a 5.31× compression ratio. This result shows that GOBO according to some embodiments remains effective even when using FP16 is possible.

Embedding Table Quantization: In some embodiments, GOBO can also be used to quantize the embedding tables.

TABLE VII-continued

HAT model size (M), embedding (E) and compression ratio (CR).

| HAT: WMT'14 En-Fr | BLEU | Error | M(MB) | E(MB) | M CR | CR |
|---|---|---|---|---|---|---|
| KMeans 4-bit(M) [11] | 41.1 | 0.7 | 28 | 217 | 8× | 1.8× |
| GOBO 4 bit (M) | 41.5 | 0.3 | 29 | 217 | 7.8× | 1.8× |
| GOBO 4-bit (E + M) | 41.4 | 0.4 | 29 | 28 | 7.8× | 7.8× |

Table VIII

SpanBERT FP16 model quantization.

| SpanBERT | SQuAD v1.1 | | SQuAD v2 | | |
|---|---|---|---|---|---|
| | F1 Score | Error | F1 Score | Error | CR |
| Baseline FP16 | 93.96% | — | 88.68% | — | 1× |
| GOBO 3-bit | 93.15% | 0.81% | 88.68% | 0% | 5.31× |
| GOBO 4-bit | 93.9.4% | 0.02% | 88.76% | −0.08% | 3.99× |

TABLE IX

Embedding size (MB) and compression ratio (CR).

| Model/Task | Baseline | GOBO | | | |
|---|---|---|---|---|---|
| | FP32 | 3-bit | CR | 4-bit | CR |
| BERT-Base/MNLI | 89.42 MB | 8.63 | 10.36× | 11.42 | 7.83× |
| BERT-Large/SQuADv1.1 | 119.22 MB | 11.26 | 10.59× | 14.98 | 7.95× |
| DistilBERT/MNLI | 89.42 MB | 8.85 | 10.10× | 11.63 | 7.69× |
| RoBERTa/MNLI | 147.26 MB | 14.18 | 10.38× | 18.77 | 7.84× |
| RoBERTa-Large/MNLI | 196.34 MB | 18.41 | 10.66× | 24.55 | 8.00× |

Figure 4:
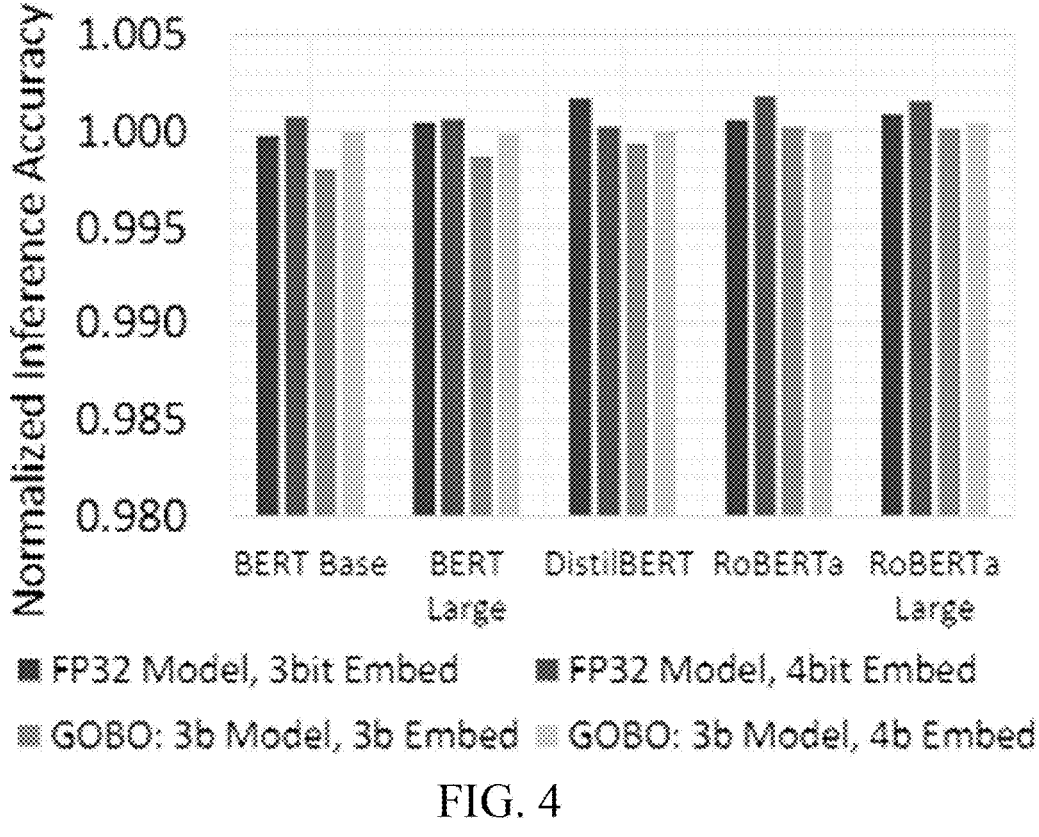
FIG. 4 shows an effect of embedding table quantization on accuracy according to an embodiment.

Table IX shows the size of embedding table before and after quantization. The outlier threshold for all of these experiments is set to −4. FIG. 4 is a graph of example effects of embedding table quantization on accuracy. FIG. 4 compares the inference accuracy of each model in two scenarios: in the first, only the embedding layer was quantized and the model weights were kept in their original FP32 representation. This experiment illustrates the effect of embedding quantization on the original model's accuracy. This approach not only maintains the model's accuracy but, in certain cases, improves it. In the second scenario, GOBO quantization was applied throughout. While the FC layers' weights are quantized to 3b, using 4b embedding maintained accuracy, whereas 3b incurred a 0.2% accuracy loss.

TABLE VII

HAT model size (M), embedding (E) and compression ratio (CR).

| HAT: WMT'14 En-Fr | BLEU | Error | M(MB) | E(MB) | M CR | CR |
|---|---|---|---|---|---|---|
| Baseline FP32 [11] | 41.8 | — | 227 | 217 | 1× | 1× |

GOBO—Memory Compression

A practical application of GOBO where it is used to compress weights in off-chip memory will now be described. FIG. 5A to 5C are schematic diagrams or a graph of an example GOBO memory compression according to some embodiments. In some embodiments, this allows GOBO to reduce memory traffic and energy and increase effective memory capacity. Regardless of the dataflow used, the weights of each layer can be accessed sequentially, in large enough chunks to maximize reuse. Accordingly, a format that supports streaming accesses into the weight matrix is sufficient. The example weight matrix of 768×768 of FIG. 5A can be used to explain how GOBO encodes values in memory and how it decompresses them. FIG. 5A shows an example weight matrix. For an arbitrary dataflow, the weight matrix can be divided into 16×16 submatrices (SM) of 256 weights each. Each SM is divided into 16 blocks where each block contains the weights that are going to be processed together by some data-parallel functional unit, e.g., a GPU shared multiprocessor, and are stored together in on-chip memory.

Long sequential accesses off-chip can be maintained and not sacrifice bandwidth utilization.

In some embodiments, GOBO is configured in memory to provide a method for memory storage, the method including configuring the memory according to a data structure, the data structure comprising: a header containing metadata; a quantized weights section, the quantized weights section storing a reference to a representative value for each parameter of a neural network, each of the references stored in a same order as a corresponding parameter in the neural network; and an outliers section storing one or more outlier parameters of the parameters of the neural network. In some embodiments, each reference for each of one or more outlier parameters of the parameters of the neural network is a dummy index, such as a sequence of 0s or other notation. The dummy index can be used by GOBO to designate use of the actual value of a value (e.g., a floating-point outlier value) without reference to a reference (e.g., index) or representative value.

For example, FIG. 5C is a schematic diagram showing a representation of a GOBO container according to some embodiments, the container comprising three sections: Header 510, Quantized Weights 520, and Outliers 530. The container can be stored in memory. The Header 510 stores the representative values, in some embodiments. The Header 510 contains the metadata describing the dimensions of the layer, the number of bits used per weight index, followed by the centroid table. The figure shows only the centroid table and assumes 8 centroids. Other numbers of centroids can be used. Padding can be used to keep the Quantized Weights section 520 that follows properly aligned to a memory row. This section contains the weight indexes which are stored in exactly the same order as the original FP32 weights would have been. However, in some embodiments, GOBO stores just a 3b per weight including the outliers. However, for the outliers the index is ignored and is superseded by the Outliers section 530 according to some embodiments. In some embodiments, a table of shorts stores the representative values, such as in Header 510.

For instance, the third weight in $SM_0^-B_0$ is an outlier, and a dummy "000" index is stored for it. This format maintains the relative position of weights and avoids the hardware support and run-time costs of data movement and re-alignment during decompression.

In some embodiments, each outlier parameter is stored as a relative block reference to a block within a submatrix of a matrix, the block containing a value of the outlier parameter, the matrix storing each of the parameters of the neural network; an offset within the block; and the value of the outlier parameter. In some embodiments, the Outlier section 530 stores an outlier count and one or more outlier parameters for each submatrix (e.g., SM) of a matrix (e.g., the weight matrix) storing each of the parameters (e.g., weights) of the neural network. The value of the outlier parameter can be a representation (e.g., an approximation) of a real number, for example. The value of the outlier parameter can be a 32-bit floating-point value or a 16-bit floating-point value, for example. Other examples include 15b or 7b values or others that use an encoding other than floating-point.

For example, the Outliers section 530 encodes the outliers in submatrix order. Each SM begins with an outlier count (8b supporting up to 256 outliers) followed by the outliers in block order. Each outlier is encoded with a triplet (B, W, V) where B (4b) is the relative block within the SM, W is the weight offset (4b) within the block, and V is the FP32 value. In our example, $SM_0$ contains 2 outliers with the first replacing the third weight in block 0 (dashed arrow).

In some embodiments, to make quantization transparent to the processing elements, the decompression engine 540 is configured to generate a stream of FP32 weights. The decompression engine 540 can use two concurrent sequential access streams. The first reads the Header 510 and then the Quantized weights 520. The Header 510 is used to set the lookup tables (LUT) in the decompression engine 540. There is one LUT per weight that can be decompressed concurrently, a configuration parameter. Once the Header 510 is read, the first stream is configured to process the weight indexes placing them in a FIFO which feeds the LUTs that replace them with the appropriate centroids. Concurrently, the second stream is configured to read in the Outliers section 530 placing values in another FIFO. Using the information per outlier, the outliers selectively overwrite the LUT provided values. Since outliers are rare, processing at most one per cycle has been shown experimentally to be sufficient in some embodiments. Other data structures can be used.

FIG. 5B is a graph showing an example effect of SM size on compression ratio and illustrates using 16×16 submatrices with some embodiments of GOBO. The graph shows the compression ratio for the BERT-Base model for various SM sizes and for weight quantizations of 2b to 6b. The error bars show what the compression rate would have been if there were no outliers at all. In this case, every weight would be represented by $\log_2(\# \text{bins})$ bits. This representation serves as a useful measure for judging how well the method works. The measurements show that using SMs of 256 weights or more, achieves nearly the maximum possible compression ratio for all weight quantization widths according to some embodiments.

The described memory layout is suitable for example when the dataflow is pre-determined making sequential accesses to all components possible. To allow the dataflow to change without changing the layout, minor changes to the Outlier memory layout can be used. In some embodiments, the method for memory storage further includes: configuring the memory according to a first additional data structure storing outlier counts; and configuring the memory according to a second additional data structure storing outlier parameters. For example, the outlier counts and the outliers can be stored separately into two linear arrays C and O respectively. C contains the counts in cumulative form (entry $C_i$ reports the number of outliers before the ith SM) so that they can serve as indexes into O. To access the outliers of the ith SM, an extra memory reference will first read $C_i$ and use it as an index to start fetching the outliers from O. The number of outliers contained in the SM is given by $C_{i+1}-C_i$.

GOBO—Compute Acceleration

In some embodiments, GOBO is configured to generate an output from performing one or more multiply-accumulate operations $A_1B_1+ \ldots +A_nB_n$ on input vectors A and input vectors B, wherein n is the n-th input vector and wherein one or more of input vectors B are each one of the representative values, by accumulating input vectors A to an accumulated sum of input vectors A per input vector B having the same representative value and subsequently multiplying each of the accumulated sums of input vectors A by the representative value of the input vector B. Additionally, there can be one or more input vectors B that are each one of the additional values (e.g., outlier values or outlier weights) such that each one of the additional values are computed (e.g., multiplied with $A_m$ for an input vector $B_m$) without using any representative value of the additional value as the additional value is computed in the operation as-is.

In some embodiments, GOBO is configured to configure a memory according to a data structure, the data structure storing one or more representative values for values in a neural network; retrieve one or more of the representative values; and perform a computation using the representative values.

A representative value can be a value of a neural network such as a floating point parameter, representation of a real number, weight, activation, or other value. In some embodiments, GOBO is configured to select the representative values based on a property related to the values of the neural network. For example, representative values can be selected as centroids, such as described herein. As another example, a representative value can be a value selected from the values of the neural network that can be used as a representation of one or more other values of the neural network or of a component of the neural network, such as a component that includes the representative value.

In some embodiments, GOBO is configured to execute a computation of the neural network, where the computation relates to a value of the neural network (e.g., during training or classification). GOBO is configured to execute that computation by retrieving one or more representative values from the memory to use as that value in the computation. A reference to the representative value, such as a reference (e.g., index) to the memory location where the representative value is stored, is stored in a data structure (e.g., at 520) and GOBO is configured to retrieve that reference, follow that reference (e.g., retrieve the value stored in the memory location at that reference), and use the representative value in a computation. For example, the representative value can be for an activation value of the neural network, where GOBO is configured to perform a computation of multiplying a weight value with an activation value and adding multiple weight value and activation value products by accumulating (e.g., summing) weight values to be multiplied with activation values having the same representative value (e.g., as indicated by the same reference stored in memory for that activation value) and, for each activation value having the same representative value, subsequently retrieving the representative value from memory and multiplying the representative value with the corresponding accumulation of weight values.

As an example, most of the computation may occur in FC layers, each of which is a weight matrix and activation vector multiplication. The use of a very small dictionary allows transformation of the computation from many "lookup to translate weight index to its FP32 centroid followed by a multiply-accumulate with an FP32 activation" (one per weight) to an FP32 activation accumulation per weight index followed by a few FP32 multiply-accumulate operations (one per centroid per output activation). That is, rather than first decoding each weight to its centroid and then multiplying with the corresponding activation, this computer functionality for computation can be improved by, given a weight index, accumulating the corresponding activation into a per centroid sum, and after doing so for all quantized weights, multiplying just these few sums with the centroids. For example, in a layer with 4 input activations $A_i$ and one output activation OA, when weights are not quantized, this rudimentary FC layer performs the computation in Eq. 2. In some embodiments, GOBO is configured to perform computations in a neural network according to Eq. 5. For example, GOBO can be configured to perform Eq. 2 as Eq. 5. The computation can be performed in a layer of the neural network or other component of the neural network, such as other than in a fully connected layer.

$$OA = A_1 W_1 + A_2 W_2 + A_3 W_3 + A_4 W_4 \qquad (2)$$

$$= A_1 V_{(W_1')} + A_2 V_{(W_2')} + A_3 V_{(W_3')} + A_4 V_{(W_4')} \qquad (3)$$

$$= A_1 V_1 + A_2 V_2 + A_3 V_3 + A_4 V_4 \qquad (4)$$

$$= \underbrace{(A_1 + A_4) V_1}_{a} + \underbrace{(A_2 + A_3) V_2}_{b} \qquad (5)$$

In some embodiments, the weights are quantized to two centroids $V_1$ and $V_2$, with $W_1$ and $W_4$ mapping to $V_1$, and $W_2$ and $W_3$ mapping to $V_2$. If $W_i$ the 1b weight indexes to V dictionary values, and $V_{(w\ i)}$ refers to mapping a weight index $W_i$ onto its corresponding centroid, the computation can be transformed as shown in Eqs. 3-5. In Eq. 5, a is the sum of all activations whose weight maps to centroid $V_1$ and b the sum of all activations whose weight maps to centroid $V_2$. When the number of centroids is much smaller than the number of activations, accumulating the activation values per centroid, and then performing one dictionary lookup and a multiplication per centroid has the potential to reduce energy since FP32 multiplications are more expensive than additions. For example, for a 768×768 FC layer with 3b weight quantization, the first approach would require per output activation 768 weight index to centroid lookups, and 768 MAC operations. Instead, in some embodiments, 8 accumulators are used and perform 768 activation accumulations in total, followed by 8 centroid lookups and 8 MAC operations (96× fewer), one per accumulator.

Re-arranging or changing floating-point arithmetic operations can be a concern for hardware and software optimizations as it can affect the outcome. Fortunately, in some embodiments, GOBO's approach effectively improves calculation fidelity as it can use separate accumulators (e.g., 8 separate accumulators). Importantly, each accumulator corresponds to a single weight index. In some embodiments, multiplying with that weight is deferred in computation until the end, and after all relevant activations have been accumulated. In FP32 hardware, these multiplications occur for all activations and weight indexes before accumulation, increasing the chances that fidelity is lost due to weight magnitude differences. Experiments were performed on some embodiments of GOBO and demonstrate that GOBO's approach preserves accuracy.

Figure 6A:
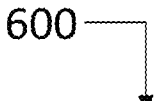
FIG. 6A shows a processing tile of a GOBO hardware accelerator according to an embodiment.
Figure 6B:
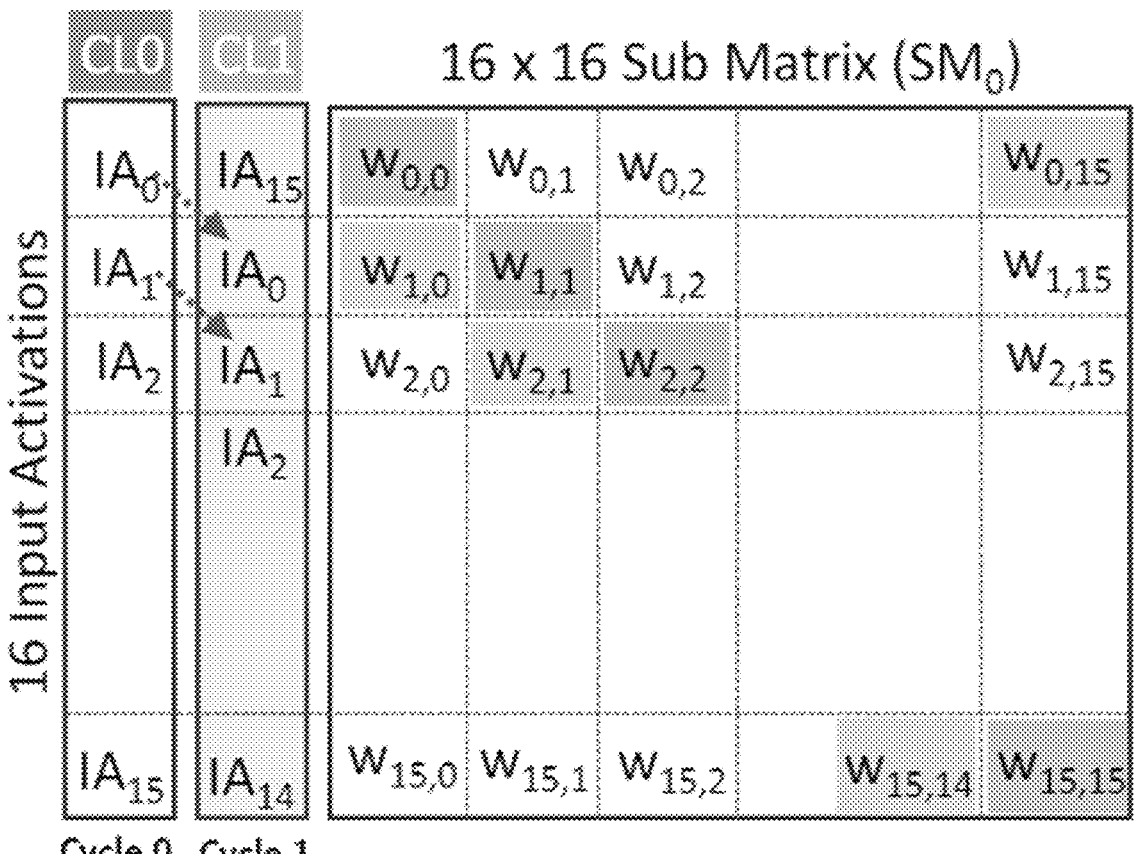
FIG. 6B shows a dataflow for a GOBO tile according to an embodiment.

Tile Architecture: In some embodiments, GOBO is configured to implement a system for computation of layers in a neural network, including one or more processing elements each configured to accumulate one or more values of the neural network for each of one or more references (e.g., "G" group weight indexes) to an identical representative value to generate an output for each accumulation; and a shared processing unit configured to, for each of the outputs from each processing element, multiply the output with the identical representative value respective to the output to generate a final output. The shared processing unit is further configured to accumulate one or more of the final outputs with one or more outlier values, according to some embodiments. For example, multiple final outputs can be added to one or more outlier values according to a computation in a neural network. The computation can be configured to perform any one of Eq. 2 to 5. The representative value can be a centroid. The one or more values of the neural network can be a value such as a parameter (e.g., a weight or an activation) of a neural network or can be a value such as an embedding (e.g., in an embedding table). FIG. 6 is a schematic diagram of an example GOBO hardware accelerator according to some embodiments. FIG. 6A shows an example tile architecture 600 of GOBO, while FIG. 6B shows an example dataflow.

For example, in some embodiments, GOBO is configured to include GOBO Tiles 600 with Processing Elements (PEs) 610 and is configured to include a Shared Processing Unit (SPU) 620. FIG. 6A is a schematic diagram according to some embodiments showing each GOBO Tile containing a column of 16 PEs 610. Each PE 610 contains an FP32 adder and an 8-entry register file, one per possible weight index. The PE 610 is designed to process 3b weight indexes (GOBO can combine tiles to process wider weight indexes). The 16 PEs 610 are all connected to a single SPU 620 which has a 16-entry output activation register file, with one entry per PE 610. The SPU 620 performs final per centroid MAC operations and also handles any outliers. For this discussion of an example embodiment of GOBO, for clarity, an output stationary dataflow is assumed where each output activation is produced by one only PE 610. Various dataflows can be used and a dataflow used in experiments performed is described herein. Processing proceeds into two phases. In the first phase, the PEs 610 accumulate activations in their register files according to incoming "G" group weight indexes. In addition, the SPU 620 is activated any time an outlier is encountered. In the second phase, the SPU 620 processes the sums from each PE 610, one PE 610 at a time, multiplies them with the centroids, and produces the final output activations.

Phase 1: Per index Activation Accumulation: At the unit's front there are two circular 16-entry activation buffers. At any point, one buffer, the staging buffer, loads one activation at a time from the global buffer 630, while the PEs use the other, the current buffer. It takes 16 cycles for the staging buffer to fill, during which the current buffer rotates its entries so that each activation is seen by each PE 610. For the purposes of the following description of an example embodiment, outlier processing is not discussed. Every cycle, the quantized weight buffer 640 provides 16 weight indexes, one per PE 610. The PEs 610 use these weights to add the current activation to the corresponding register file entry. FIG. 6B shows how processing proceeds. For example, in Cycle 0, PE0 uses $W_{0,0}$ to accumulate activation $IA_0$, while PE2 uses $W_{2,2}$ to accumulate activations $IA_2$. In cycle 1, the activations are rotated by one position, and now PE0 uses $W_{0,15}$ to appropriately accumulate activation $IA_{15}$. After 16 cycles, the first block of input activations completes processing, and staging and input buffers switch roles, so that processing can proceed with $IA_{16}$ through $IA_{31}$. The 16 weights along the diagonals in the SM of FIG. 6B form a block in memory and are stored next to one another as in FIG. 5C. Once all activations have been seen, GOBO is configured to proceed to phase two.

Phase 2: Centroid Processing: This phase proceeds in centroid/PE order. As shown in FIG. 6A, the centroid values are read from the global buffer 630 one by one. Once centroid 0 is read, the SPU 620 uses 16 cycles to multiply it with the corresponding PE register file entry from each PE 610 writing the result into the SPU 620 register file entry for the PE 610. Then, the SPU 620 proceeds with centroid 1 and so on. In total it takes 8×16=128 cycles to finish phase 2. During this time, the Pes 610 are idle. The FC layers can be large so at the end this is a small overhead. According to some embodiments, GOBO more than makes up for this overhead by keeping more weights on-chip and by being able to use more PEs 610 per unit area. In some embodiments, additional SPUs 620 per tile can be used to reduce this idle time.

Outlier Processing: Outliers are processed during phase 1 by the SPU 620. The SPU 620 reads the outliers from the global buffer 630 into a FIFO 650. The outliers can be stored using the format as shown in FIG. 5C. Accordingly, the SPU 620 determines the original positions of the outliers, as it encounters them in the order they should be processed according to the described dataflow. For the next outlier in order, the SPU 620 disables accumulation in the corresponding PE 610 when the dummy weight index appear. It then waits until the corresponding activation is rotated to appear at PE15 610. At that time the SPU 620 can bypass it directly and multiply it with the outlier weight accumulating the result into the appropriate output register file entry (outliers are used as-is; they are not mapped to centroids). At the same time PE15 610 can process the activation as required. If there are multiple outliers for an activation (the weight matrix has multiple outliers in the same column), the SPU 620 will take as many cycles as needed to process them one by one. During those extra cycles, the Pes 610 are disabled.

According to some embodiments, this organization can support 4b weight indexes so that models such as RoBERTa can be executed using some embodiments of GOBO, where RoBERTa requires 4b dictionaries for some of their layers. To do so, GOBO is configured to pair adjacent tiles so that the 8-entry register files in the first tile store the accumulation of input activations corresponding to the first 8 weight indexes, and the second tile stores the rest. The output register file entries are configured to be added in pairs to generate the final output. This can be done over 16 cycles and can reuse the adder from one of the tiles.

Memory Organization: In some embodiments, a GOBO accelerator is configured to have several tiles. A banked Global Buffer supplies the tiles with the data needed. The most demanding data needs can be for the weight indexes. In some embodiments, each tile processes at peak one block of 16 weight indexes per cycle which requires 16×3b=48b per cycle. Each tile also reads a single FP32 activation per cycle at peak. However, the same activation can be shared among all tiles. Finally, each tile is configured to read in outliers which may use at most 40b each plus an 8b count per submatrix of 256 weights. However, the outliers can be infrequent, and the bandwidth used can be low. Accordingly, in some embodiments, GOBO is configured to partition the Global Buffer across the tiles in at least three banks per tile: one for activations, one wider for weights, and one for the outliers plus centroids. Note that there can be one set of centroids per layer that can be replicated across tiles.

Dataflow: Various dataflows can be used. Experiments have been performed that show that the output stationary dataflow may not be the best. In some embodiments, instead of dedicating each PE to process one output activation at a time, GOBO is configured to time multiplex over multiple subsets of activations (from multiple input words) producing partial sums. For example, GOBO is configured to block weights in groups of columns, and, where beneficial, rows, and process the corresponding activation columns producing partial sums. GOBO is configured to perform phase 1 and phase 2 processing to produce these partial sums. In some embodiments, this can provide an advantage of weight reuse across words; the same weights with the corresponding activations can be used for many words. In some embodiments, once done with all words for one group, GOBO is configured to proceed with the next group of columns (and rows) of weights.

Evaluation of GOBO

As will now be described, further experiments were conducted to evaluate the performance and energy-efficiency benefits when 1) GOBO is used to compress data off-chip in some embodiments, and 2) for an accelerator that uses GOBO compression and the GOBO processing architecture according to some embodiments.

Various models were used. The models were quantized with GOBO to 3b except for 12 layers of RoBERTa and 28 layers of RoBERTa-Large that were quantized to 4b as discussed herein. Cycle times were measured using a custom cycle-accurate simulator which uses DRAMsim2 to model off-chip transfers for a DDR4-3200 dual-channel DRAM main memory. The simulator was tested extensively with microbenchmarks. The simulator computes values faithfully in time which it compares against the expected outputs for correctness. Area and power for the on-chip memories are modeled by CACTI. Memories were divided into banks to meet the target access time and bandwidth. Post-layout energy and area estimates were used: all designs were implemented in Verilog and synthesized using Synopsys' Design Compiler with a 65 nm TSMC technology library and a 1 GHz target frequency. Layouts were generated using Cadence Innovus. For power estimation, Intel Model Sim was used to generate signal activity as input to Innovus.

Memory Compression

GOBO memory compression was incorporated according to some embodiments over three popular deep learning hardware architectures. TPU and Eyeriss were configured as described herein. To execute these models, however, these were implemented with FP32 and FP16 MAC units from a vendor provided library. The MAC units were optimized for energy efficiency. The modeled Tensor Cores accelerator was configured with 128 Tensor Core-like units and with a 2 MB on-chip buffer. Each Tensor Core unit performed a $A_{4 \times 4} \times B_{4 \times 4}$ matrix multiply producing a matrix $C_{4 \times 4}$ per cycle. It was configured to perform 64 MAC operations per cycle. In some embodiments, the dataflow of each architecture is configured to improve performance and energy efficiency.

FIGS. 7A to 7H are graphs showing an evaluation of GOBO Memory Compression and Hardware Accelerator according to some embodiments. In FIGS. 7A to 7F, bars show original FP32 models, and Markers show scaled FP16 models. B-B, B-L, DB, R-B, R-L, and S-L are short for BERT-Base, BERT-Large, DistilBERT, RoBERTa-Base, RoBERTa-Large, and SpanBERT-Large, respectively. B-L*, R-L*, and S-L* refer to BERT-Large, RoBERTa-Large, and SpanBERT-Large models on configurations of TC, TC+ and GOBO with a 4 MB on-chip buffer for FP32, and a 2 MB for FP16 architectures. EY and TC stand for Eyeriss and Tensor Cores. TPU+, EY+, TC+, IBM DLP+ use GOBO off-chip memory compression.

Figure 7A:
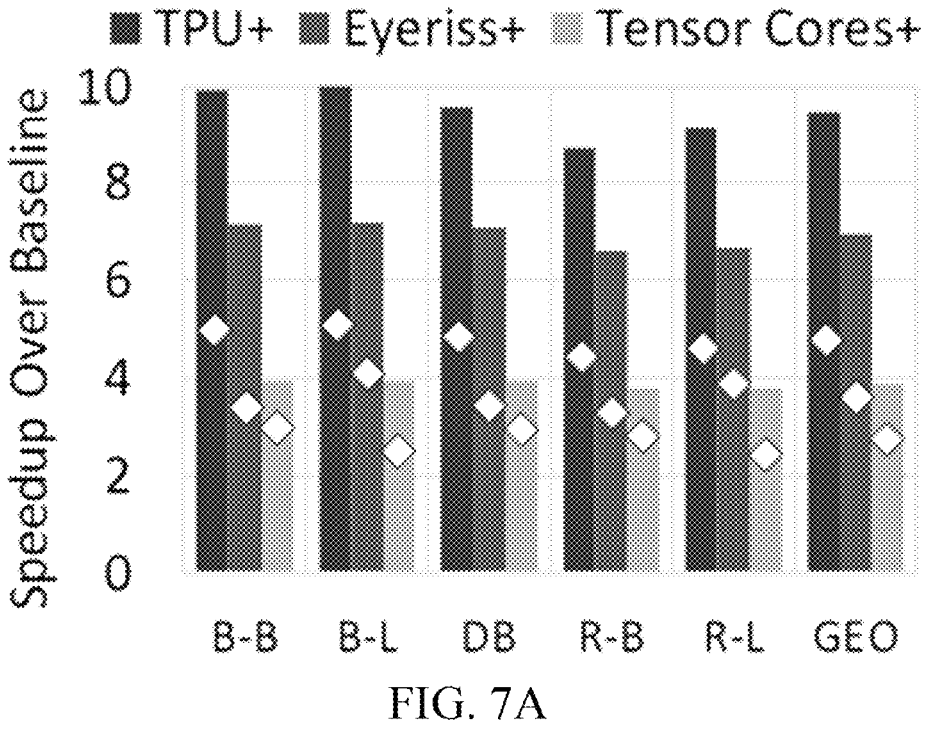
FIGS. 7A, 7B, 7C, 7D, 7E, 7F, 7G, and 7H are graphs showing the evaluation of GOBO memory compression and hardware acceleration according to an embodiment.

FIG. 7A is a graph showing speedups when GOBO memory compression was used according to some embodiments described herein. Speedups were measured over the corresponding architecture without GOBO. Note that these models are not sparse and use FP32 which can make zero compression or other compression methods targeting fixed-point neural networks inapplicable.

TPU: Performance for the TPU improved nearly by 10×. The TPU keeps all activations on-chip and reads weights from off-chip memory. It is severely memory bound on the weight side thus benefiting fully from the traffic reduction possible with GOBO according to some embodiments. Speedups are slightly lower for Distil-BERT and the RoBERTa models. The size of the FC layers in DistilBERT leads to different utilization of the TPU's systolic array, and as a result, the potential for improvement from memory compression is different than it is for the BERT models. The RoBERTa models have layers that are quantized to 4b instead of 3b.

Eyeriss: Speedup on Eyeriss using GOBO according to some embodiments is at nearly 7× on average. Eyeriss optimizes the dataflow to keep MACs busy and has much fewer MACs than server-class accelerators such as the TPU. Accordingly, the potential for speedup is lower.

Tensor Cores: This architecture is also memory bound with 16% of all memory transactions being for activations and partial sums, while weights account for the remaining 84%. Given that GOBO reduces weight footprint by nearly 10× in some embodiments, performance improved by nearly 4×.

Figure 7B:
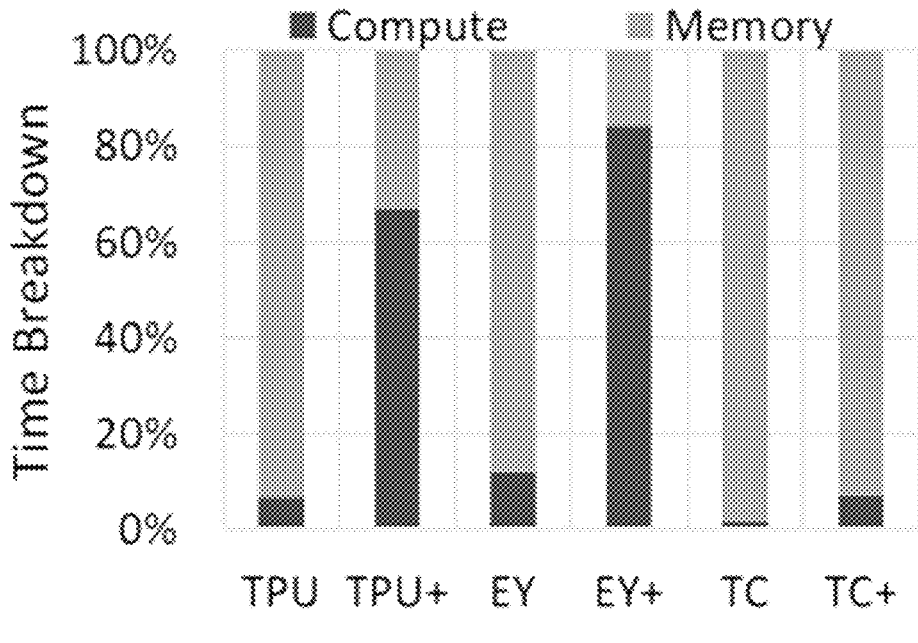

Execution Time Breakdown: FIG. 7B is a graph showing an execution time breakdown for each architecture. The configurations with GOBO memory compression are labeled as TPU+, EY+(Eyeriss), and TC+(Tensor Cores) and the graphs report averages over all networks. The measurements confirm that off-chip accesses account for most of the execution time in the baseline architectures. Using GOBO memory compression according to some embodiments, the fraction of time taken by off-chip accesses was reduced to 32% and 15% for TPU+ and Eyeriss+ respectively. TC+ was 4× faster than TC.

Figures 7C, 7D:
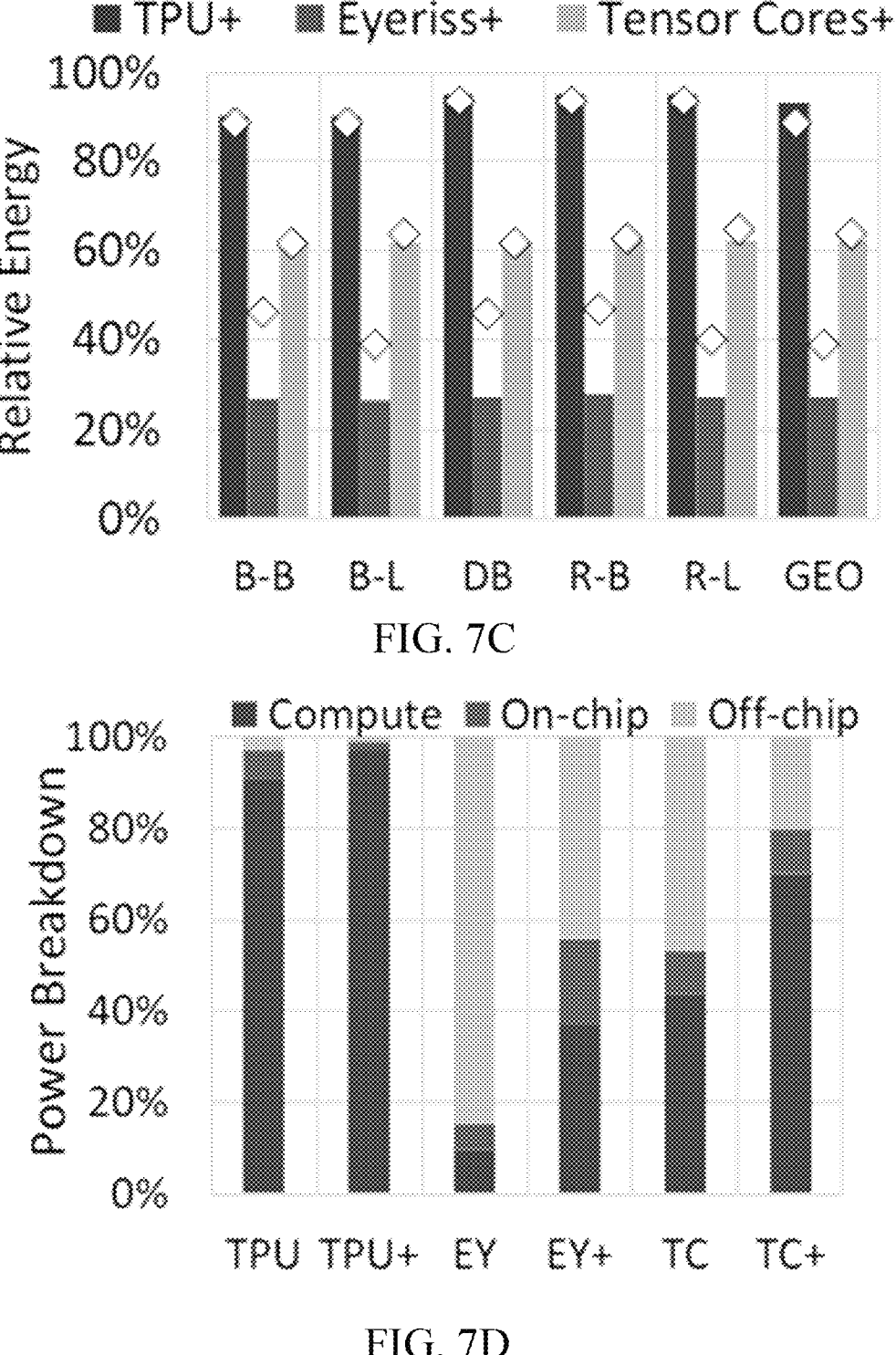

Energy: DRAM transactions can be expensive in terms of time and energy. FIG. 7C is a graph showing the energy reduction for each architecture with GOBO memory compression over the baseline according to some embodiments. TPU, whose compute grid account for 90% of overall energy consumption (see e.g., FIG. 7D), sees the least benefit of 7%. Energy consumption for Eyeriss improves on average by 3.7× since computation only accounts for 10% of total energy. In Tensor Cores, off-chip memory accounts for 47% of total energy, which GOBO reduces to 20% improving overall energy consumption by 1.6× on average according to some embodiments.

FP16: Some architectures add support for 16b floating-point as these can be sufficient for training and inference of many neural networks. FIG. 7A is a graph showing speedups with GOBO compression assuming the models can use FP16 (presently only demonstrated with SpanBERT), according to some embodiments. All hardware architectures were configured to use FP16 for off-chip traffic and on-chip processing. GOBO compression was shown to be effective throughout according to some embodiments. Speedups compared to FP32 were halved for the TPU and Eyeriss where weights dominate off-chip traffic. FP16 was less effective for TC as about 16% of the off-chip traffic is for partial sums. FIG. 7C is a graph showing the relative energy benefits with GOBO compression for the TPU and TC where most energy is consumed in the compute units, according to some embodiments. The relative benefits scale less for Eyeriss due to its small global buffer (off-chip traffic is more pronounced and using FP16 leaves less potential for compression). Still, even with FP16, GOBO compression reduces energy by 2.5× according to some embodiments.

GOBO Hardware Accelerator

An iso-compute-area comparison of the GOBO accelerator (according to some embodiments) with Tensor Cores and IBM DLP like architectures was performed. For Tensor Cores, both FP32 and FP16 variants were evaluated, and for the IBM DLP FP16 hardware was modelled.

The FP32 comparison with Tensor Cores will now be described. Tensor Cores and GOBO FP32 designs were given the same 2 MB on-chip memory. Table X summarizes the configurations. The FP32 Tensor Cores' tile was 6.2× larger than the GOBO tile while it has 4× more multipliers and accumulators. GOBO was configured to replace each multiplier with an accumulator and an entry register file, and have only a single MAC unit that is shared across multiple PEs. Table XI shows the GOBO tile area breakdown. An FP32 multiplier was 4.1× larger than an 8-entry register file. As a result, for the same compute area needed by 128 Tensor Cores, 768 GOBO tiles can be used.

Figure 7E:
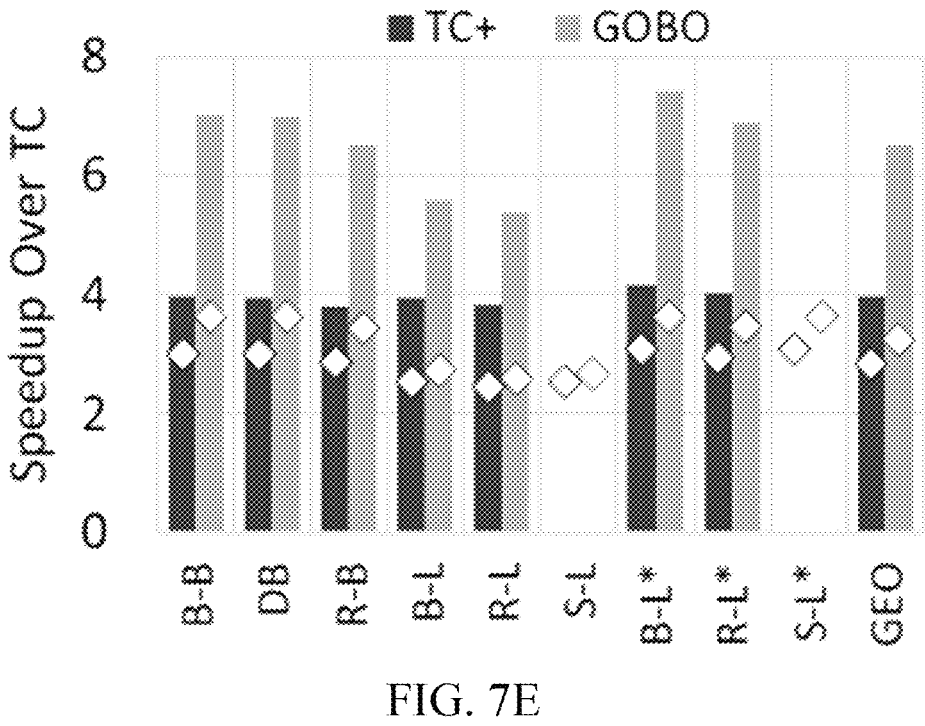
Figure 7F:
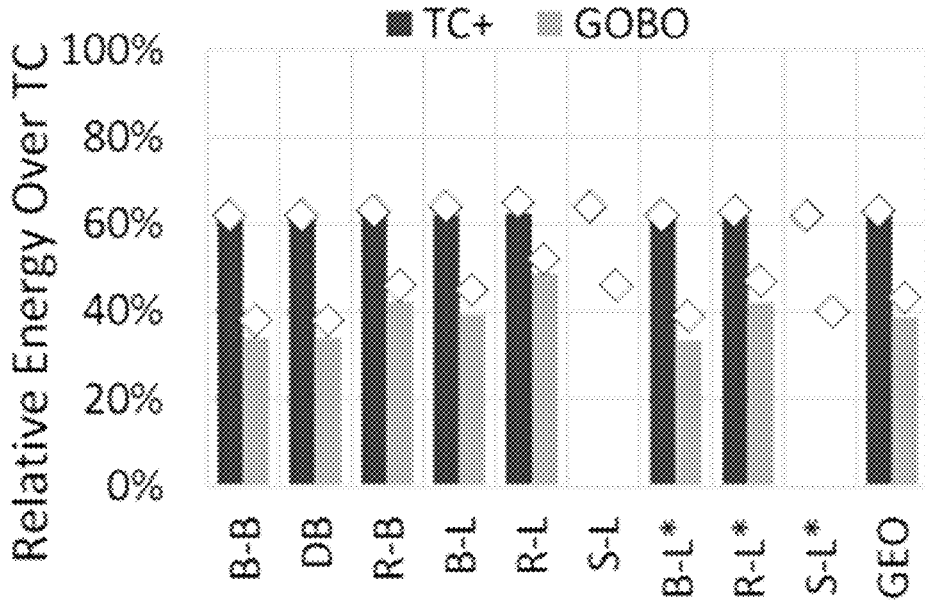
Figure 7G:
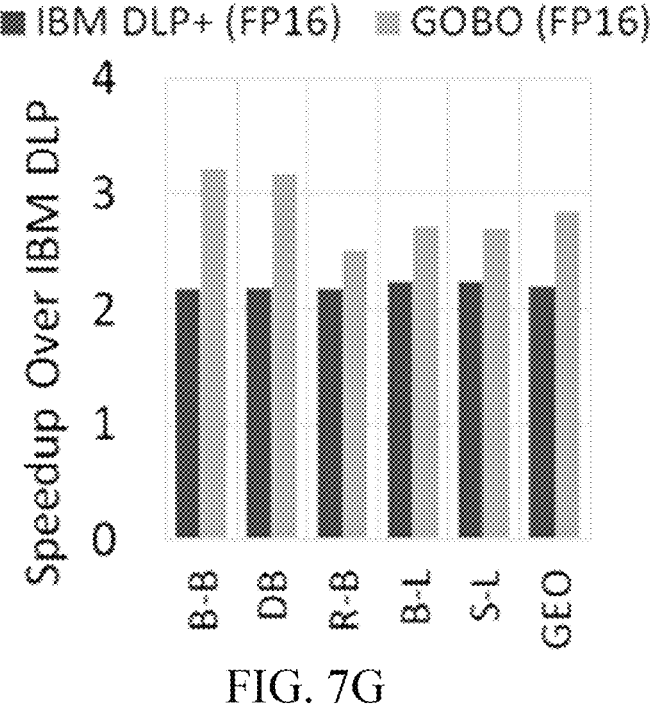
Figure 7H:
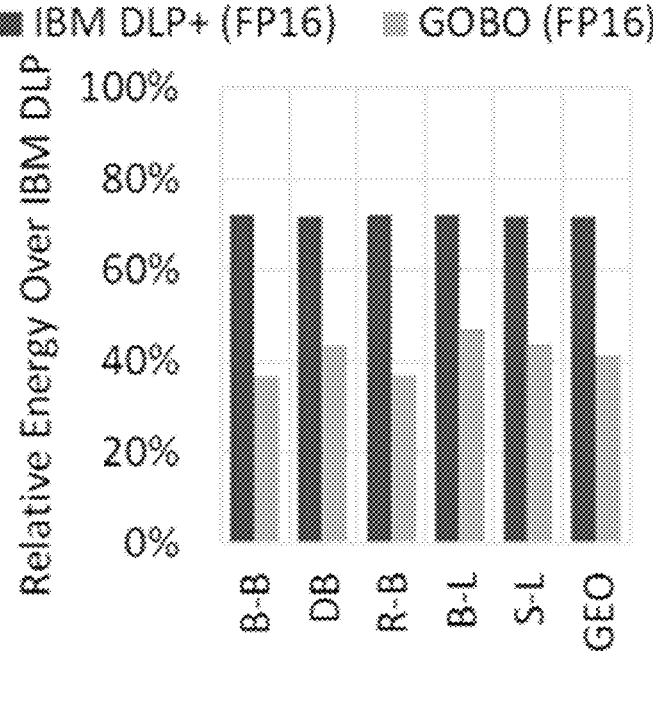

Performance: FIG. 7E is a graph showing the performance of some embodiments of GOBO relative to the baseline Tensor Cores (TC) and the Tensor Cores with GOBO off-chip compression (TC+). In this configuration, TC+ was about 4× faster than TC across all models. GOBO was 7× faster than TC for BERT-base and DistilBERT. Speedups with GOBO were slightly lower for RoBERTa as peak throughput was halved for those layers that are quantized to 4 bits. There are at least two primary reasons why GOBO improves performance in some embodiments. First, IBM DLP: IBM's Deep learning Processor is an FP16 systolic array with a 2 MB on-chip buffer. Experiments were performed on embodiments of GOBO demonstrating that a) IBM DLP benefits from GOBO memory compression (IBM DLP+), and b) under iso-compute-area constraints GOBO accelerator is higher performing and more energy efficient, according to some embodiments. DLP's systolic array was configured with 512 MACs to match the 1K FLOPS/cycle originally reported. GOBO's tiles were 1.2× smaller than DLP's allowing 20% more tiles to be fit. GOBO was configured with the same 2 MB on-chip capacity. FIGS. 7G and 7H are graphs showing some embodiments of GOBO Accelerator's and IBM DLP+'s performance and relative energy over the IBM DLP baseline. GOBO memory compression increased PE utilization from 34% to 75% in DLP+, making it 2.2× faster, whereas GOBO is even faster at 2.85× as its PE utilization is 83%, according to some embodiments. GOBO was the most energy efficient: 2.4× vs. DLP+ and 6.8× vs the original DLP.

TABLE X

| Tensor Cores & GOBO: Area. | | | | |
|---|---|---|---|---|
| | Tile Area (mm$^2$) | Tiles/Chip | MAC/Tile | MAC/Chip |
| Tensor Cores FP32 | 0.84 | 1× | 128 | 64 | 1× |
| GOBO FP32 | 0.13 | 0.16× | 768 | 16 | 1.5× |
| TensorCores FP16 | 0.27 | 1× | 160 | 64 | 1× |
| GOBO FP16 | 0.05 | 0.20× | 768 | 16 | 1.2× | it has a higher peak compute throughput than TC as it can afford to pack more compute units for the same area. Second, it better utilizes the on-chip memory buffers as it keeps weights encoded throughout. GOBO's speedup over TC on the large models capped at 5.5× due to size of the on-chip buffer. To show how performance would scale with a larger on chip buffer BERT-Large (B-L*) and RoBERTa-Large (R-L*) were evaluated with TC, TC+ and GOBO configurations using a 4 MB on-chip buffer. This resulted in higher speedups.

Energy: Relative energy trends in as shown in the graph in FIG. 7F follow those of performance closely. For example, GOBO consumed 3× less energy than TC on BERT-base and DistilBERT. Compute accounts for a large portion of TC, so avoiding FP32 multiplications greatly improved energy consumption. Table XII reports absolute performance and energy for BERT-Base on TC, TC+ and GOBO. Overall, GOBO was 21× more energy efficient than TC according to some embodiments.

FP16: The FP32 configurations were scaled to use FP16 instead. Table X reports the configurations when both TC and GOBO use FP16 units and a 1 MB on-chip buffer according to some embodiments. Given the non-linear scaling of FP multipliers, the ratio of TC to GOBO tiles decreased from 6.2× to 5×. The same number of GOBO tiles were kept and the TC tiles were increased so that both used the same compute area. FIG. 7E is a graph that shows the relative performance of FP16 TC+(uses GOBO compression) and GOBO over FP16 TC. GOBO compression made TC+2.8× faster than TC and the GOBO accelerator is even faster at 3.3×. Moreover, GOBO remained the most energy efficient architecture of the three according to some embodiments. FIG. 7F is a graph that reports that GOBO consumes 2.4× less energy compared to TC. Using just GOBO compression improves TC+'s energy over TC by 1.6×. Table XII reports absolute performance and energy for these FP16 configurations.

TABLE XI

| GOBO FP32 Tile Area Breakdown | | | | | |
|---|---|---|---|---|---|
| Component Area (μm$^2$) | | | Module Area (μm$^2$) | | Area/Tile |
| FP32 Adder | 4,149 | 1× | PE | 6,780 | 80.02% |
| FP32 Multiplier | 9,379 | 2.26× | SPU | 17,883 | 13.19% |
| PE Reg File (8 × 32) | 2,628 | 0.63× | Buffers | 8,046 | 5.94% |
| SPU Reg File (16 × 32) | 4,630 | 1.12× | | | |

TABLE XII

| Tensor Cores & GOBO: Absolute Perf. & Energy. | | | | | | |
|---|---|---|---|---|---|---|
| | | | BERT-Bae (MNLI) | | | |
| | Peak TFLOPS | | Cycles (M) | | Energy (J) | |
| Architecture | FP32 | FP16 | FP32 | FP16 | FP32 | FP16 |
| TC | 16 | 20 | 70.2 | 35.3 | 0.24 | 0.11 |
| TC+ | 16 | 20 | 17.8 | 11.8 | 0.15 | 0.07 |
| GOBO | 24 | 24 | 9.9 | 9.7 | 0.08 | 0.04 |

In some embodiments, GOBO is configured to provide a post-training quantization method for attention-based NLP models. In some embodiments, GOBO significantly reduces model size (e.g., parameters and embedding tables) with little or no effect on accuracy. GOBO can be used in at least two practical applications. In the first, which is plug-in compatible with other accelerators, GOBO is used to compress data from off-chip boosting energy efficiency and off-chip capacity. In the second, an accelerator is configured to use GOBO quantization throughout. It is unique at least in that it never expands the weights into their original values directly, according to some embodiments.

Various embodiments of the present invention have been described in detail. The present invention may be embodied in other specific forms without departing from the nature, spirit, or scope of the invention. The discussed embodiments are to be considered illustrative and not restrictive; the scope of the invention is to be indicated by the appended claims rather than the described details of the embodiments. Therefore, all changes which come with the meaning and range of equivalency of the claims are intended to be embraced therein.

What is claimed is:

1. A system for computation of layers to accelerate computation in a neural network stored in a computer memory, comprising:

a Tensor Processing Unit (TPU) or a Graphics Processing Unit (GPU);

a hardware accelerator comprising one or more tiles, each tile comprising a global buffer, a quantized weight buffer, and one or more processing elements coupled to a Shared Processing Unit (SPU) configured to optimize on-chip memory;

one or more processing elements each configured to accumulate one or more values of the neural network for each of one or more references to an identical representative value to generate an output for each accumulation; and the SPU configured to, for each of the outputs from each processing element, multiply the output with the identical representative value respective to the output to generate a final output;

wherein the SPU is further configured to accumulate one or more of the final outputs with one or more additional values if present to generate an accumulated output, the one or more additional values being determined using a probability density function defining a probability that each additional value belongs to a distribution;

wherein the one or more values are stored as indexes and provided to the one or more processing elements via the quantized weight buffer;

wherein the SPU is activated whenever the one or more additional values are encountered, and the SPU reads the one or more additional values from the global buffer in preparation for a decompression computation;

wherein each of the additional values has a probability density function (pdf) less than a threshold value, the pdf defined by $$pdf(x \mid \mu, \sigma^2) = \frac{1}{\sqrt{2\pi\sigma^2}} e^{-\frac{(x-\mu)^2}{2\sigma^2}},$$

wherein x is the additional value, u is a mean of one or more parameters in the component of the neural network having x, and o is a standard deviation of one or more parameters in the component of the neural network having x; and upon a computation being required of the neural network, the SPU is configured to:

retrieve from a data structure in the memory at least one final output, at least one accumulated output, or both from the memory using a reference to a memory location where the at least one representative value, at least one additional value of the one or more additional values, or both are stored; and perform a decompression computation of multiplying the additional value with a corresponding representative value of the at least one representative value and adding multiple additional values and corresponding representative value products by summing additional values to be multiplied with corresponding representative values having the same reference stored in memory for that corresponding representative value and subsequently retrieving the reference from memory and multiplying the reference with the corresponding accumulation of additional values.

2. The system of claim 1, further comprising one or more tiles, each tile comprising the one or more accumulators and the shared multiplier-accumulator.

3. The system of claim 2, wherein the one or more accumulators are 16 accumulators.

4. The system of claim 2, wherein each of the one or more accumulators comprise a 32-bit floating point (FP32) adder and an 8-entry register file.

5. The system of claim 3, wherein the shared multiplier-accumulator has a 16-entry output activation register file.

6. Use of the system of claim 1 for natural language processing.

7. The system of claim 2, further comprising a global buffer which supplies the one or more tiles with data to be processed.

8. A computer system for implementing memory compression on a neural network stored in a computer memory, comprising:

the memory;

at least one Tensor Processing Unit (TPU) or Graphics Processing Unit (GPU) and a hardware accelerator comprising one or more tiles, each tile comprising a global buffer, a quantized weight buffer, and one or more processing elements coupled to a Shared Processing Unit (SPU) containing a decompression engine, which is configured to optimize on-chip memory in communication with the computer memory, the memory comprising instructions which, when executed by the at least one TPU or the GPU, carries out the steps of:

storing a neural network in the memory by:

determining if one or more additional values of the neural network exist;

storing, in the memory, one or more values of the neural network each as a reference to a representative value; and if the one or more additional values exist, storing, in the memory, the one or more additional values of the neural network;

wherein the one or more values are stored as indexes and provided to the one or more processing elements via the quantized weight buffer;

wherein the SPU is activated whenever one or more additional values are encountered, and the SPU reads the one or more additional values from the global buffer in preparation for the activation of the decompression engine;

wherein the one or more additional values are determined using a probability density function defining a probability that each additional value belongs to a distribution;

wherein each of the additional values is in a component of the neural network and has a probability density function pdf less than a threshold value, the pdf defined by $$pdf(x \mid \mu, \sigma^2) = \frac{1}{\sqrt{2\pi\sigma^2}} e^{-\frac{(x-\mu)^2}{2\sigma^2}},$$

wherein x is the additional value, u is a mean of one or more parameters in the component of the neural network having x, and o is a standard deviation of one or more parameters in the component of the neural network having x;

upon a computation being required of the neural network, retrieving from a data structure at least one representative value, at least one additional value, or both from the memory using a reference to a memory using a reference to a memory location where the one or more representative values, one or more additional values or both are stored; and the decompression engine performing a decompression computation of multiplying the additional value with a corresponding representative value of the at least one representative value and adding multiple additional values and corresponding representative value products by summing additional values to be multiplied with corresponding representative values having the same reference stored in memory for that corresponding representative value and subsequently retrieving the reference from memory and multiplying the reference with the corresponding accumulation of additional values.

9. The computer system of claim 8, each of the one or more representative values being generated by:

assigning each of the one or more values of the neural network to a cluster; and for each cluster, selecting a selected value from the cluster as the representative value for each of the one or more values of the neural network of the cluster.

10. The computer system of claim 9, the steps further comprising: minimizing a sum of each distance between a) each of the one or more values of the neural network and b) the selected value of the cluster that the value is assigned to by iteratively:

performing the assigning, the assigning further comprising reassigning a first value of the one or more values of the neural network from an original cluster of the clusters to a new cluster of the clusters where an original distance of the first value to the selected of the original cluster is greater than a new distance of the first value to the selected value of the new cluster; and subsequently performing the selecting on at least the original cluster and the new cluster;

wherein the first value is a different value of the one or more values of the neural network upon each iteration.

11. The computer system of claim 8, wherein performing the decompression computation includes:

generating an output from performing one or more multiply-accumulate operations $A1\ B1+ \ldots +AnBn$ on input vectors A and input vectors B, wherein n is the n-th input vector and wherein one or more of input vectors B are each one of the representative values, by accumulating input vectors A to an accumulated sum of input vectors A per input vector B having the same representative value and subsequently multiplying each of the accumulated sums of input vectors A by the representative value of the input vector B.

12. The computer system of claim 8, wherein storing the neural network in the memory includes configuring the memory according to a data structure comprising:

a header containing metadata;

a quantized weights section, the quantized weights section storing a reference to a representative value for each parameter of a neural network, each of the references stored in a same order as a corresponding parameter in the neural network; and an outliers section storing one or more outlier parameters of the parameters of the neural network.

13. The computer system of claim 12, wherein each reference for each of the one or more outlier parameters of the parameters of the neural network is a dummy index.

14. The computer system of claim 13, wherein the dummy index is used to designate use of the actual value of a value without reference to a reference or representative value.

15. Use of the system of claim 8 for natural language processing.

* * * * *